United States Patent
Carson et al.

(10) Patent No.: US 6,871,902 B2
(45) Date of Patent: Mar. 29, 2005

(54) QUICK RELEASE SACRIFICIAL SHIELD AND WINDOW ASSEMBLY

(75) Inventors: Dale E. Carson, Murrieta, CA (US); Jerry L. Farrar, Banning, CA (US)

(73) Assignee: Transit Care, Inc., Murrieta, CA (US)

( * ) Notice: Subject to any disclaimer, the term of this patent is extended or adjusted under 35 U.S.C. 154(b) by 0 days.

(21) Appl. No.: 10/184,094

(22) Filed: Jun. 25, 2002

(65) Prior Publication Data
US 2003/0057733 A1 Mar. 27, 2003

Related U.S. Application Data

(63) Continuation-in-part of application No. 09/395,692, filed on Sep. 13, 1999, now Pat. No. 6,408,574, which is a continuation-in-part of application No. 09/186,513, filed on Nov. 4, 1998, now Pat. No. 6,205,723.

(51) Int. Cl.[7] .................................................. B60J 1/10
(52) U.S. Cl. ........................... 296/146.15; 296/146.16; 52/204.5; 52/204.591
(58) Field of Search ........................... 296/146.15, 201, 296/146.16, 146.5, 146.1; 359/265; 52/208, 202, 204.591, 235, 265, 204.62, 171.3, 204.5, 209, 786.1, 786.13, 203; 49/504, DIG. 1; 428/34, 412, 192, 425.6

(56) References Cited

U.S. PATENT DOCUMENTS

| | | |
|---|---|---|
| 1,533,731 A | 4/1925 | Foley |
| 1,828,515 A | 10/1931 | Stone |
| 1,945,742 A | 2/1934 | Hilger |
| 1,973,792 A | 9/1934 | Barrows |
| 1,977,899 A | 10/1934 | Shapiro et al. |
| 2,163,566 A | 6/1939 | Blessin |
| 2,221,005 A | 11/1940 | Reese |
| 2,267,542 A | 12/1941 | Walz |
| 2,371,430 A | 3/1945 | de Patto |
| 2,667,378 A | 1/1954 | Holme-Shaw |
| 3,004,305 A | 10/1961 | Goodemote et al. |
| 3,025,098 A | 3/1962 | Andrews |
| 3,140,115 A | 7/1964 | Bliss |
| 3,226,779 A | 1/1966 | Rust |
| 3,266,560 A | 8/1966 | Mooskian |
| 3,312,023 A | 4/1967 | Zell |

(Continued)

FOREIGN PATENT DOCUMENTS

| | | |
|---|---|---|
| DE | 2038176 | 9/1971 |
| EP | 106 629 | 4/1984 |
| GB | 715795 | 9/1954 |

Primary Examiner—Kiran Patel
(74) Attorney, Agent, or Firm—Knobbe, Martens, Olson & Bear, LLP

(57) ABSTRACT

Disclosed is a window assembly for use in mass transit vehicles which allows the quick and easy removal and replacement of transparent sacrificial glazing panels which protect the glazing of the window from vandalism and wear. The window assembly utilizes a sacrificial protective panel and mounting arrangement which allows quick and easy replacement of protective panels on one or both sides of the window assembly, but inhibits removal by non-maintenance personnel such as vandals. The frame of the window assembly incorporates one or more retainers which fit into slots along the interior sides of the window frame and sandwich the glazing between the frame and the retainers. In turn, the retainers are essentially "locked" into position in the frame by an inner protective panel, which significantly inhibits the removal of the retainers from the window assembly when the protective panel is in its desired position against the windowpane. Once the inner protective panel is removed from the window assembly, however, the retainers and glazing can quickly and easily be removed from the frame, allowing the glazing and any remaining protective panels to be quickly and easily removed from the frame. Alternatively, the sacrificial panel may be retained by an integrally formed recess defined by the frame.

3 Claims, 14 Drawing Sheets

U.S. PATENT DOCUMENTS

| | | | |
|---|---|---|---|
| 3,599,596 A | | 8/1971 | Remus et al. |
| 3,656,798 A | | 4/1972 | Dodgen et al. |
| 3,667,179 A | * | 6/1972 | Eisenberg .............. 52/204.595 |
| 3,686,795 A | | 8/1972 | La Barge |
| 3,704,563 A | | 12/1972 | Waller |
| 3,774,363 A | | 11/1973 | Kent |
| 3,824,753 A | | 7/1974 | Anderson |
| 3,869,198 A | | 3/1975 | Ballentine |
| 3,923,339 A | | 12/1975 | McDonald |
| 3,925,947 A | | 12/1975 | Meyers et al. |
| 3,959,941 A | | 6/1976 | Smith |
| 3,971,178 A | | 7/1976 | Mazzoni et al. |
| 4,196,545 A | | 4/1980 | Korany et al. |
| 4,205,486 A | | 6/1980 | Guarnacci |
| 4,248,018 A | | 2/1981 | Casamayor |
| 4,261,649 A | | 4/1981 | Richard |
| 4,280,414 A | | 7/1981 | Allshouse et al. |
| 4,292,771 A | | 10/1981 | Ellis |
| 4,328,644 A | | 5/1982 | Scott |
| 4,331,359 A | | 5/1982 | Sheldon |
| 4,332,412 A | | 6/1982 | Nakazawa et al. |
| 4,333,283 A | | 6/1982 | Ebata |
| 4,349,993 A | | 9/1982 | Tanaka et al. |
| 4,358,488 A | | 11/1982 | Dunklin et al. |
| 4,364,209 A | | 12/1982 | Gebhard |
| 4,364,595 A | | 12/1982 | Morgan et al. |
| 4,430,831 A | | 2/1984 | Kemp |
| 4,431,228 A | * | 2/1984 | Grise .................... 296/146.15 |
| 4,472,914 A | * | 9/1984 | DeBoef et al. ........ 52/204.593 |
| 4,474,403 A | | 10/1984 | Miller |
| 4,478,003 A | | 10/1984 | Flett |
| 4,494,342 A | | 1/1985 | Decker |
| 4,543,283 A | | 9/1985 | Curtze et al. |
| 4,555,867 A | | 12/1985 | Stibolt |
| 4,555,869 A | | 12/1985 | Kenkel |
| 4,562,666 A | | 1/1986 | Young, III |
| 4,663,885 A | | 5/1987 | Stibolt |
| 4,673,609 A | | 6/1987 | Hill |
| 4,723,809 A | | 2/1988 | Kida et al. |
| 4,726,149 A | | 2/1988 | Tryba |
| 4,763,454 A | | 8/1988 | Brockhaus |
| 4,768,823 A | | 9/1988 | Martinez |
| 4,799,344 A | | 1/1989 | Francis |
| 4,800,681 A | | 1/1989 | Skillen et al. |
| 4,823,511 A | | 4/1989 | Herliczek et al. |
| 4,924,628 A | | 5/1990 | Ruby et al. |
| 4,940,622 A | | 7/1990 | Leavitt, Sr. et al. |
| 4,967,507 A | | 11/1990 | Visnic et al. |
| 4,989,912 A | | 2/1991 | Furman |
| 4,991,349 A | | 2/1991 | Barthelemy |
| 5,002,326 A | | 3/1991 | Westfield et al. |
| 5,046,284 A | * | 9/1991 | Harper ................. 296/146.15 |
| 5,050,348 A | | 9/1991 | Kane et al. |
| 5,062,248 A | | 11/1991 | Kunert |
| 5,081,793 A | | 1/1992 | Mauro |
| 5,085,021 A | | 2/1992 | Kunert |
| 5,101,596 A | | 4/1992 | Moore |
| 5,137,770 A | | 8/1992 | Rothe et al. |
| 5,150,943 A | | 9/1992 | Gold |
| 5,169,205 A | | 12/1992 | James |
| 5,176,420 A | | 1/1993 | Kato |
| 5,242,207 A | * | 9/1993 | Carson et al. ......... 296/146.15 |
| 5,261,206 A | | 11/1993 | Mesnel et al. |
| 5,339,568 A | | 8/1994 | Hanemaayer |
| D350,322 S | | 9/1994 | Carson et al. |
| 5,396,746 A | | 3/1995 | Whitmer |
| 5,509,711 A | | 4/1996 | Gold |
| 5,525,177 A | | 6/1996 | Ross |
| 5,529,366 A | | 6/1996 | Gold |
| 5,546,704 A | | 8/1996 | Maruoka |
| 5,570,548 A | | 11/1996 | Hopper |
| 5,584,526 A | | 12/1996 | Soldner |
| 5,609,938 A | | 3/1997 | Shields |
| 5,613,325 A | | 3/1997 | Mariel |
| 5,635,281 A | | 6/1997 | Agrawal |
| 5,636,484 A | * | 6/1997 | DeBlock .................... 52/204.5 |
| 5,671,491 A | | 9/1997 | Ladd |
| 5,679,435 A | | 10/1997 | Andriash |
| 5,702,148 A | | 12/1997 | Vaughan et al. |
| 5,735,089 A | | 4/1998 | Smith et al. |
| 5,765,325 A | * | 6/1998 | DeBlock .................... 52/204.5 |
| 5,768,837 A | | 6/1998 | Sjoholm |
| 5,778,599 A | | 7/1998 | Saito |
| 5,809,707 A | | 9/1998 | Bargados et al. |
| 5,848,496 A | | 12/1998 | Bertolini et al. |
| 5,893,600 A | * | 4/1999 | McManus .............. 296/146.15 |
| 5,907,927 A | | 6/1999 | Lieb et al. |
| 6,007,899 A | | 12/1999 | Yoshizawa |
| 6,012,257 A | * | 1/2000 | Caplette ................ 52/204.593 |
| 6,047,500 A | * | 4/2000 | Caplette ..................... 49/466 |
| 6,105,973 A | * | 8/2000 | Butler et al. ........... 52/204.591 |
| 6,131,339 A | | 10/2000 | Ramus |
| 6,158,372 A | | 12/2000 | Erskine |
| 6,164,715 A | | 12/2000 | Mosaner |
| 6,205,723 B1 | * | 3/2001 | Farrar et al. ................... 52/202 |
| 6,206,453 B1 | * | 3/2001 | Farrar et al. ........... 296/146.15 |
| 6,263,627 B1 | | 7/2001 | Schonenbach et al. |
| 6,286,891 B1 | | 9/2001 | Gage et al. |
| 6,312,043 B1 | | 11/2001 | Blackburn et al. |
| 6,397,662 B1 | * | 6/2002 | Alkhoury ................... 73/31.04 |
| 6,408,574 B1 | * | 6/2002 | Farrar et al. ................ 52/204.5 |
| 6,419,298 B2 | * | 7/2002 | Farrar et al. ........... 296/146.15 |
| 6,425,215 B2 | * | 7/2002 | Farrar ................... 296/146.15 |
| 6,493,128 B1 | * | 12/2002 | Agrawal et al. ........... 52/204.5 |
| 6,585,311 B2 | * | 7/2003 | Farrar et al. ........... 296/146.15 |
| 2002/0003356 A1 | | 1/2002 | Davis et al. |
| 2002/0184840 A1 | | 12/2002 | Farrar et al. |
| 2003/0057733 A1 | * | 3/2003 | Carson et al. ......... 296/146.15 |

\* cited by examiner

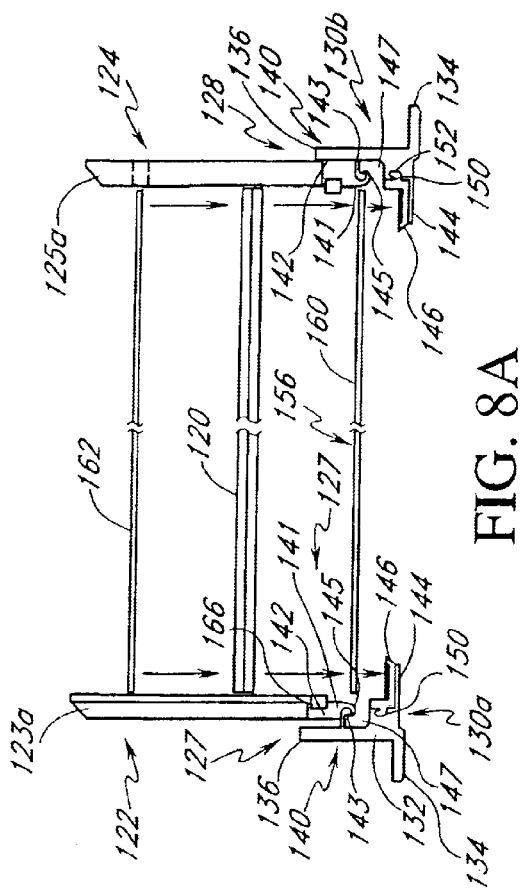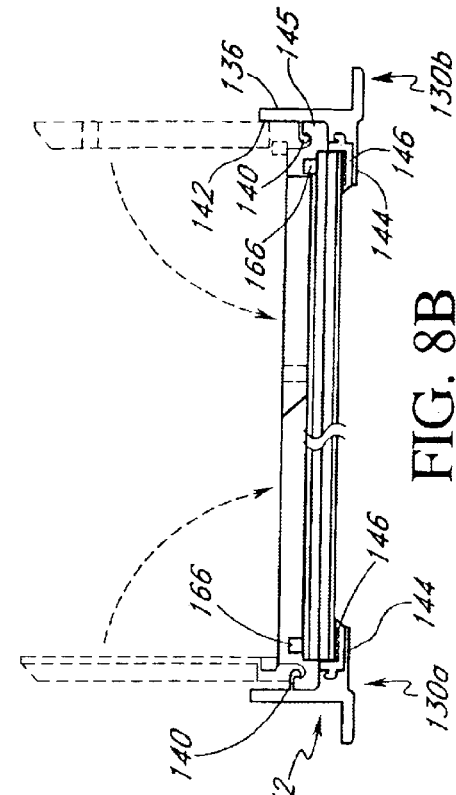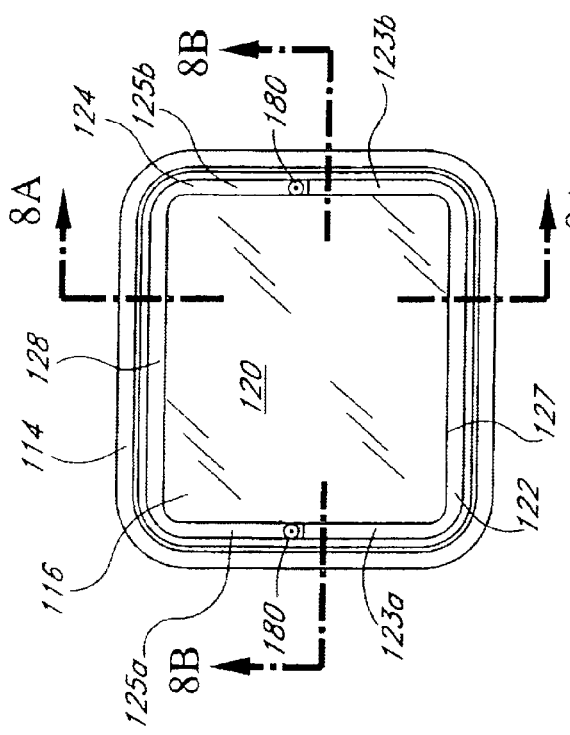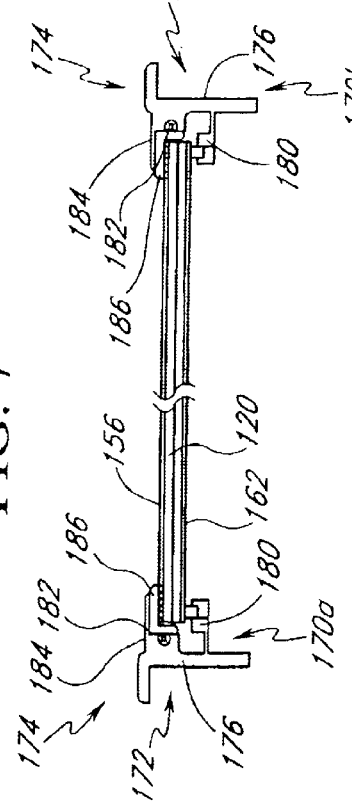
FIG. 8A
FIG. 8B
FIG. 7
FIG. 9

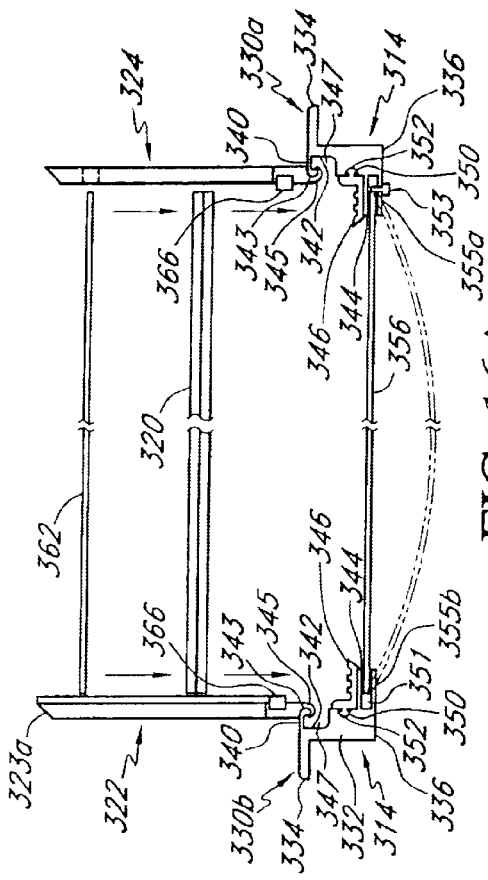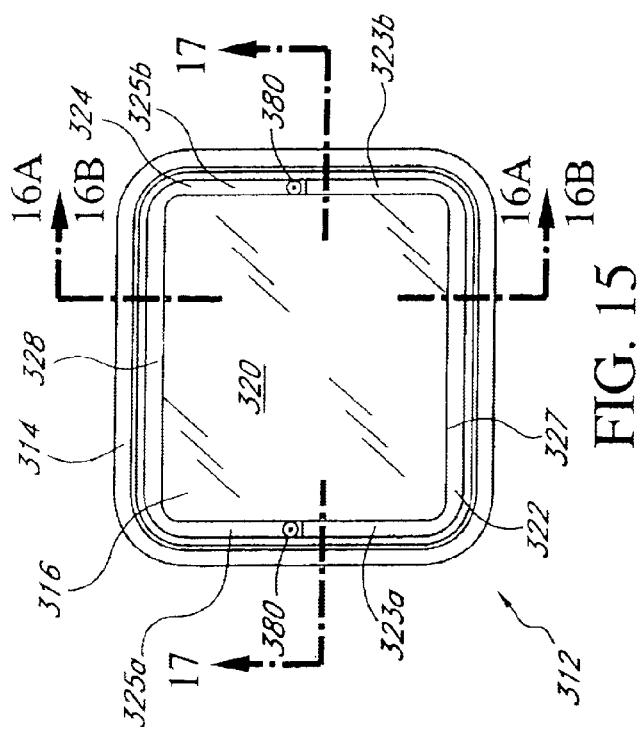

QUICK RELEASE SACRIFICIAL SHIELD AND WINDOW ASSEMBLY

RELATED APPLICATIONS

This application is a continuation-in-part of U.S. patent application Ser. No. 09/395,692 filed Sep. 13, 1999, now U.S. Pat. No. 6,408,574, entitled Quick Release Sacrificial Shield for Window Assembly which was a continuation-in-part of U.S. patent application Ser. No. 09/186,513 filed Nov. 4, 1998 entitled Quick Release Sacrificial Shield for Window Assembly now U.S. Pat. No. 6,205,723 issued Mar. 27, 2001. This application also claims priority from U.S. patent application Ser. No. 09/395,692 filed Sep. 13, 1999, and U.S. patent application Ser. No. 09/186,513 filed Nov. 4, 1998.

FIELD OF THE INVENTION

The present invention relates to window assemblies and apparatus for protecting the glazing of motor vehicles. More particularly, the present invention relates to a window assembly for use in mass transit vehicles which allows the quick and easy removal and replacement of transparent sacrificial protective panels which protect the glazing of a window from vandalism and wear.

BACKGROUND OF THE INVENTION

A sacrificial protective panel is typically a relatively inexpensive transparent sheet of material, such as plastic, protecting a more expensive windowpane or glazing behind it. Generally of the same shape and size as the glazing they protect, sacrificial protective panels are typically positioned against the glazing, with the protective panel desirably absorbing any impact and/or damage directed towards the glazing. Desirably, any damage to the window assembly will be limited to the protective panel, which can be replaced at low cost, thereby significantly increasing the useful life of the window assembly. In addition, various types of solvents which cannot be used on the glass windowpane can often be used on the glazing panels to remove graffiti. Window assemblies employing sacrificial protective panels are commonly used in mass-transit vehicles, particularly buses and trains, where vandalism and wear to the glazing are problems. Use of sacrificial protective panels saves the cost and difficulty incurred with removing and replacing the complete window assembly.

Various types of sacrificial protective panels and mounting arrangements for windows of mass transit vehicles are well known in the art. For example, U.S. Pat. Nos. 5,242,207 and 5,735,089, which are incorporated herein by reference, describe and illustrate window protectors for use in mass transit vehicles. While these arrangements allow the use of sacrificing protective panels, the installation and replacement process of glazing panels in these arrangements is typically a time-intensive process which requires a number of specialized tools to complete. On the other hand, window assemblies incorporating easily-removable sacrificial panels typically also permit vandals to remove these same protective panels, significantly increasing the likelihood of damage to the glazing. In addition, where a protective panel is held in the window assembly by one or more exposed flexible mountings and/or gaskets, such mountings and/or gaskets can easily be damaged by vandals, necessitating expensive and time-consuming replacement of the mountings and/or gaskets as well as the remaining components of the window assembly.

Hence, there is continuing need for improved assemblies for protecting window glazing in mass transit vehicles from damage. While some of the existing assemblies do provide protection, some of the existing assemblies are often more difficult to manipulate such that replacement of the sacrificial protective sheets, or even the glazing itself, is complicated. Generally, it is preferable to be able to quickly replace all of the necessary protective sheets and glazing with a minimum of time and effort in order to keep maintenance costs at a minimum.

Further, existing window protection assemblies typically only protect the inner surface of the glazing. It will be appreciated, however, that both the inner surfaces and the outer surfaces of the glazing can be damaged thereby affecting the appearance of the window.

A need in the art exists, therefore, for a sacrificial protective panel and mounting arrangement in which the glazing panels can be quickly and conveniently replaced with a minimum of specialized tools, but in which the protective panel cannot easily be removed and/or the mounting assembly cannot easily be damaged by non-maintenance personnel. Moreover, this mounting assembly should also be suited for protecting both sides of the glazing of a window and still permit easy replacement and repair.

SUMMARY OF THE INVENTION

The aforementioned needs are satisfied by one aspect of the invention which in one aspect relates to a window assembly mounted in a wall of a vehicle having an interior and an exterior surface. The assembly comprises a molded frame that is adapted to be positioned within the wall of the vehicle. The frame includes a transverse surface that extends through an opening in the wall and defines a window opening and an external perpendicular surface that is positioned adjacent the external surface of the wall of the vehicle when the frame is positioned within the wall. The frame further includes a seating member that extends inward from the transverse surface of the frame into the window opening such that the transverse surface of the frame and the seating member define a glazing mounting location. The frame further includes a flange that is offset from the seating member towards the interior surface of the vehicle and extends inward from the transverse surface of the frame into the window opening such that the flange is substantially parallel to the seating member. The seating member, the transverse surface, and the flange define a recess that extends substantially about at least two opposed sides of the window opening adjacent the interior surface of the vehicle. The assembly further comprises a piece of glazing positioned at the glazing mounting location within the frame of the vehicle so as to occupy the window opening. The seating member inhibits the piece of glazing from moving inwards towards the interior surface of the wall of the vehicle but permits the piece of glazing to be removed from the frame adjacent the exterior surface of the wall of the vehicle when the frame is positioned within the wall of the vehicle. The assembly further comprises a protective sheet positioned adjacent the piece of glazing such that at least two opposing edges of the protective sheet are positioned within the recess at the at least two opposed sides of the window.

BRIEF DESCRIPTION OF THE DRAWINGS

FIG. 7 is an inside elevational view illustrating the window protector assembly of FIG. 6;

FIGS. 8A and 8B are cross-sectional views of the window protector assembly of FIG. 7 taken along the lines of 8—8;

FIG. 9 is a cross-sectional view of the window protector assembly of FIG. 2 taken along the lines 9—9;

FIG. 15 is an outside elevational view illustrating the window protector of FIG. 14;

FIGS. 16A and 16B are cross-sectional views of the window protector assembly of FIG. 15 taken along the lines of 16—16;

FIG. 17 is a cross-sectional view of the window protector assembly of FIG. 10 taken along the lines of 17—17;

DETAILED DESCRIPTION OF THE PREFERRED EMBODIMENT

Figure 1:
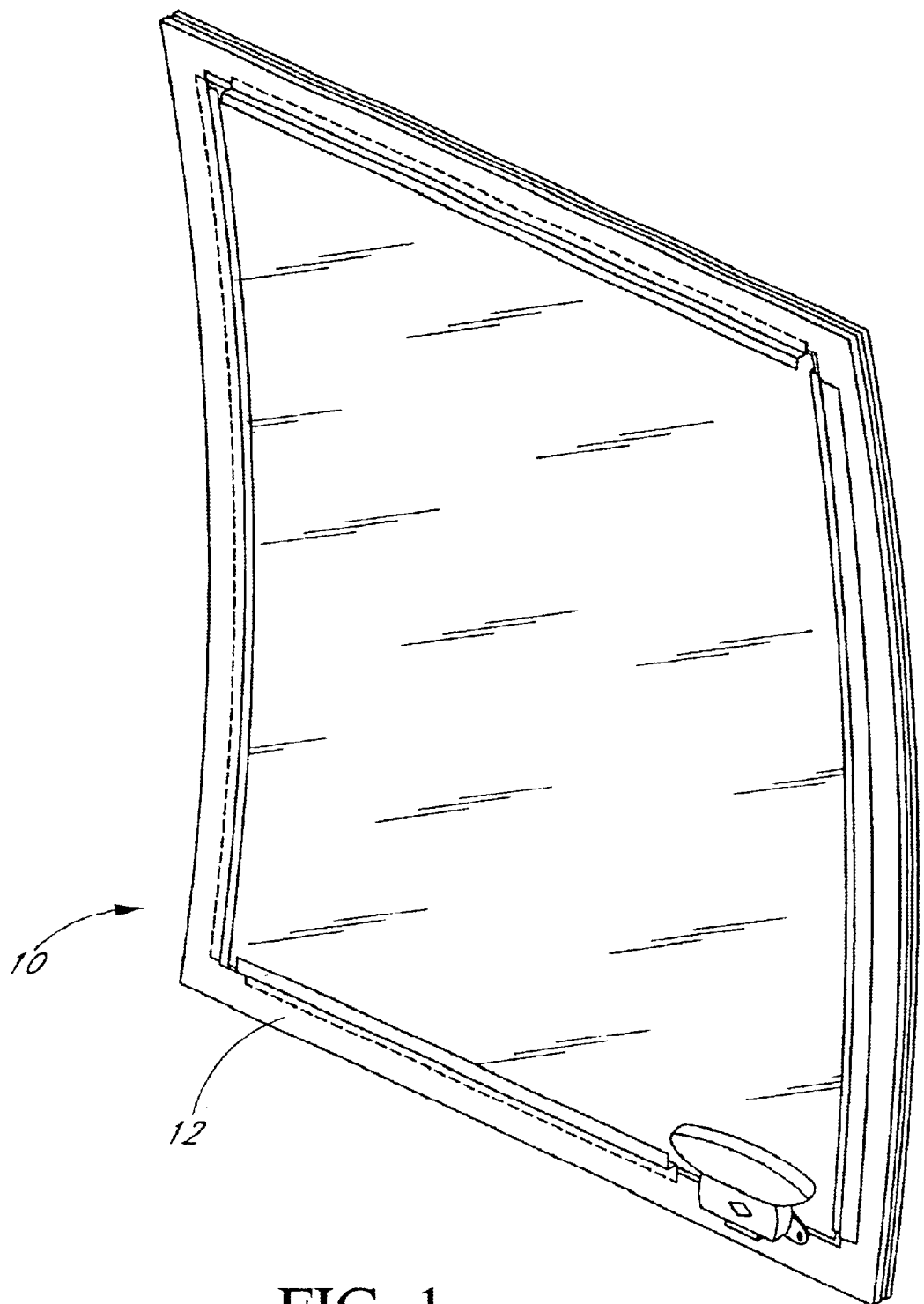
FIG. 1 is an elevated perspective view of a conventional window assembly for a mass-transit vehicle such as a bus or train.

FIG. 1 depicts a conventional window assembly 10 typically used in mass transit vehicles such as buses and/or trains. With initial reference to FIGS. 1–3, disclosed is one embodiment of a window assembly 10 constructed in accordance with the present invention. The window assembly 10 typically comprises a rectangular or regularly shaped closed frame 12, preferably comprised of metal or rigid plastic, which is mounted to the vehicle (not shown) or, alternatively, could be formed integrally with the vehicle. The frame 12 desirably comprises an inwardly-facing L-shaped support leg 18, which desirably extends about the entire periphery of the frame 12. In the disclosed embodiment, the support leg 18 comprises a transverse base 22 and an inwardly extending support face 24, substantially normal to the base 22, for receiving and supporting a corresponding L-shaped gasket 20. Preferably, the base 22 includes an elongated channel 26 for receiving a corresponding extension 28 from the gasket 20 to interlock the gasket 20 to the frame 12.

A piece of glazing 14 desirably sits within the gasket 20 which surrounds the periphery of the glazing 14 and desirably cushions the glazing 14 from vibrations and/or impacts experienced by the vehicle in a known manner. The transverse base 22 and support face 24 of the frame 12 and the gasket 20 desirably provide side support and an edge seal for an outside and marginal edge of the glazing 14 in the frame 12. In the disclosed embodiment, the glazing 14 is desirably equal to or smaller than the opening formed in the frame 12 by the L-shaped support legs 18.

A retainer 32 releasably secures the inner edge of the glazing 14 within the frame 12. As illustrated, the retainer 32 desirably comprises a vertically extending retention member 36 having a lower vertically extending leg 34 shaped to fit into an elongated pocket 30 formed in the frame 12. The retention member 36 further comprises a window gasket 42 a supplemental gasket 43 positioned on the upper surface of the window gasket 42 and a protective panel gasket 44, with these gaskets 42, 43, 44 desirably extending outward from the member 36 towards the glazing 14.

Preferably, the retainer 32 is formed of a resilient material such as aluminum, plastic or a composite material with the extending leg 34 including a serrated portion which mates with a serrated interior of the elongated pocket 30 to tightly yet releasably secure the retainer 32 to the frame 12. Of course, one skilled in the art would recognize that various other locking arrangements could be used to ensure positive retention of the retainer 32 within the pocket 30, such as interlocking ridges, hooks, or the like. In addition, the retention member 36 desirably includes elongated spaced side cavities 38 and 40, for releasably receiving the window gasket 42 and protective panel gasket 44, respectively.

When the retainer 32 is secured to the frame 12, with the lower leg 34 positioned within the elongated pocket 30, the lower surface of the glazing 14 is desirably sandwiched between the window gasket 42, the supplemental gasket 43 and the L-shaped gasket 20. These gaskets 42, 43 and 20 are desirably formed of an elastic material having good rebound characteristics, such as rubber, silicone or the like, which allow the window gasket 42 to be compressed against the glazing 14 when the retainer 32 is installed and/or removed from the frame 12, but rebounds and pushes against the glazing 14 when released, desirably securing the glazing 14 in position and biasing the serrated portions of the lower leg 34 and the elongated pocket 30 together.

Figure 2:
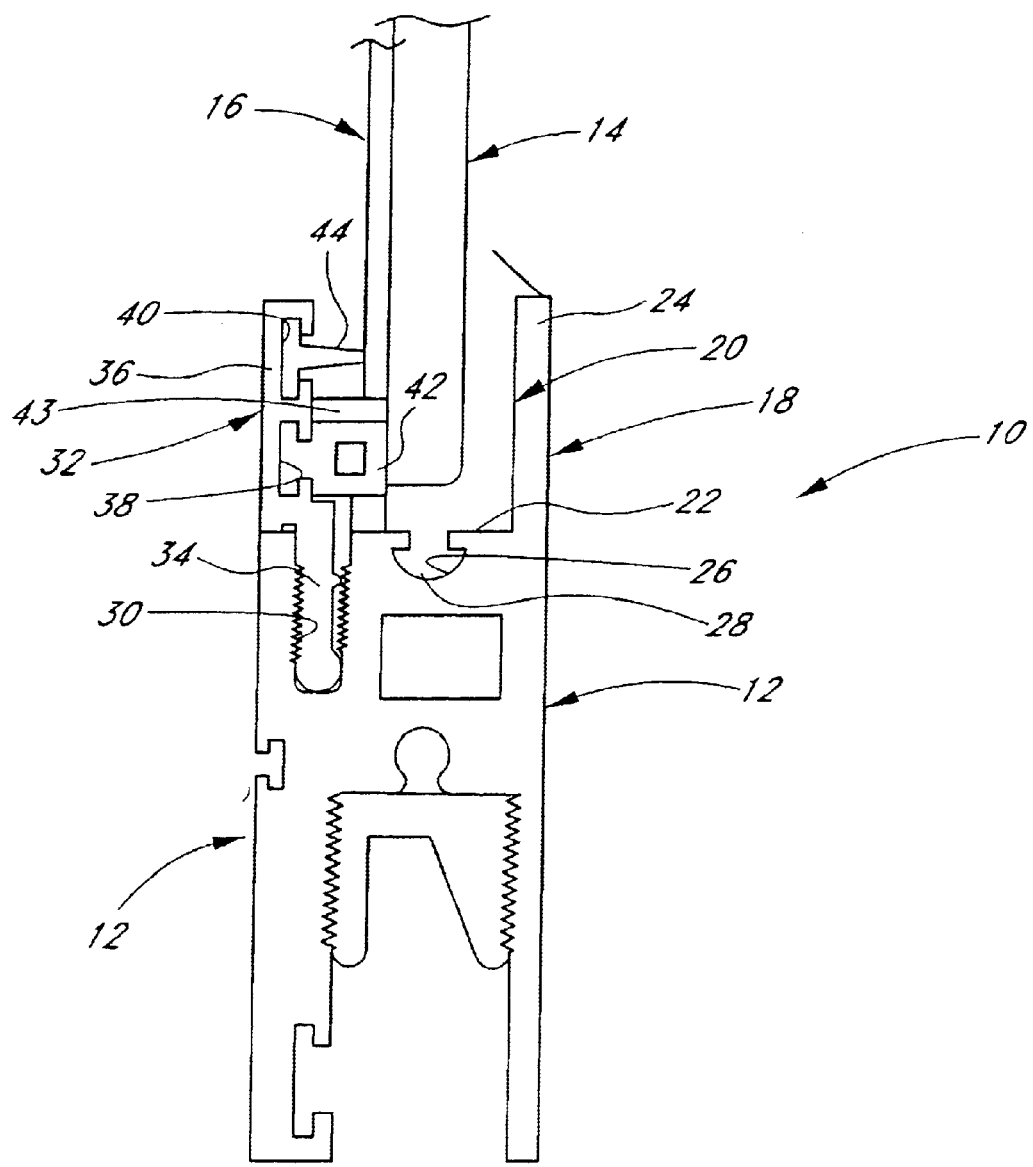
FIG. 2 is a partial sectional side view of a window assembly constructed in accordance with one embodiment of the present invention.
Figure 3:
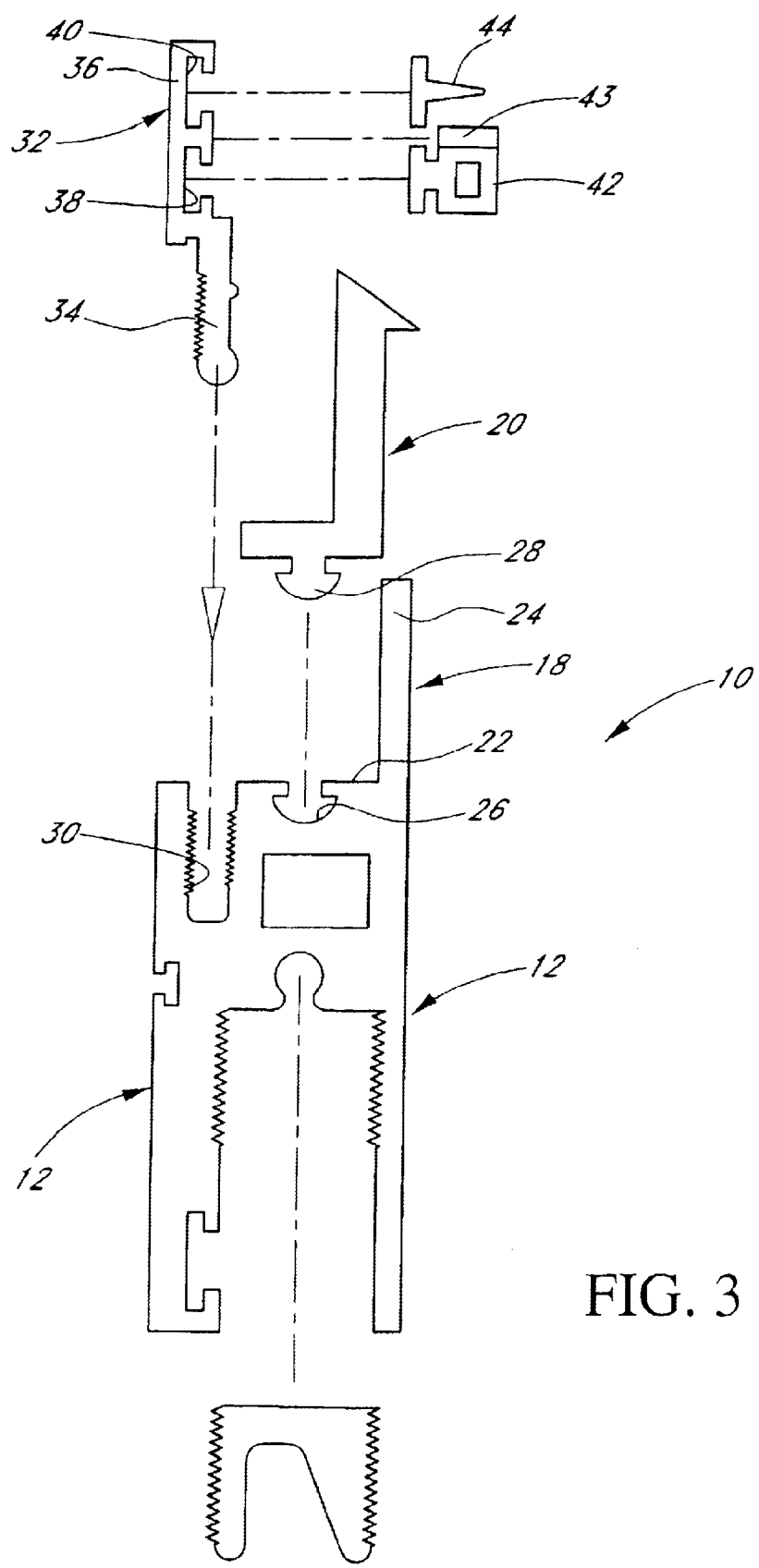
FIG. 3 is an exploded view of the window assembly of FIG. 2.

As shown in FIG. 2, a sacrificial protective panel 16 is desirably positioned against the glazing 14 and inserted between the retainer 32 and the glazing 14. Desirably, the protective panel 16 slides between the protective panel gasket 44 and the glazing 14, with the lower edge of the protective panel 16 abutting against the supplemental gasket 43, such that the lower edge of the protective panel 16 prevents removal of the retainer 32 from the frame 12. Moreover, as previously noted, the presence of the protective panel 16 between the protective panel gasket 44 and the glazing 14 biases the serrated portions of the lower leg 34 and the elongated pocket 30 together. In this manner, the protective panel 16 is secured against the glazing 14 by the protective panel gasket 44, and the retainer 32 is secured within the frame 12.

In the embodiment disclosed, the protective panel gasket 44 is desirably T-shaped, a shape which desirably facilitates insertion and removal of the protective panel 16 from the frame 12. Of course, as well known in the art, a wide variety of alternate shapes and sizes of gaskets would accomplish the goals of the present invention, including triangular, rounded and/or angled gasket surfaces. Furthermore, the window gasket 42 desirably incorporates a flattened, partially flattened or curved surface facing towards the edge of the protective panel 16, an orientation which facilitates retention of the retainer 36 in the frame 12 by the protective panels 16. In addition, those skilled in the art will appreciate that a single gasket (not shown), incorporating the shapes of both the protective panel gasket 44 the window gasket 42 and the supplemental gasket 43, could be used in place of the gaskets 42, 43 and 44 with varying degrees of utility.

While not shown, the upper portion of the frame 12 may incorporate a similar retainer and frame arrangement as previously described, as may the right and left portions of the frame 12. Such arrangements would maximize the ease with which the glazing 14 and protective panel 16 could be removed and/or replaced in the window assembly 10. Alternatively, one or more of the edges of the window assembly 10 could be of conventional construction, incorporating permanent and/or semi-permanent retention walls. In such an arrangement, the glazing 14 would desirably slide between the permanent and/or semi-permanent retention walls of the window assembly 10, with the securing arrangement of the present invention being utilized on one or more edges to secure the glazing 14 into the window assembly 10.

If desired, the protective panel 16 can be installed into the window assembly 10 by various well known methods. For example, if the protective panel 16 is formed of a sufficiently flexible material, it may be initially flexed such that the edges of the panel 16 can be positioned against the glazing 14 at its edges, between the retainer(s). As the protective panel 16 is released, and resumes its unflexed shape, the protective panel 16 desirably passes between the retainer 32 and the glazing 14, where it desirably secures the retainer(s) 32 in the previously described manner. Such a protective panel 16 may be quickly and easily removed from the window assembly 10 using a suction gripping device (not shown), such as commonly used to transport windowpanes and mirrors.

Figure 4:
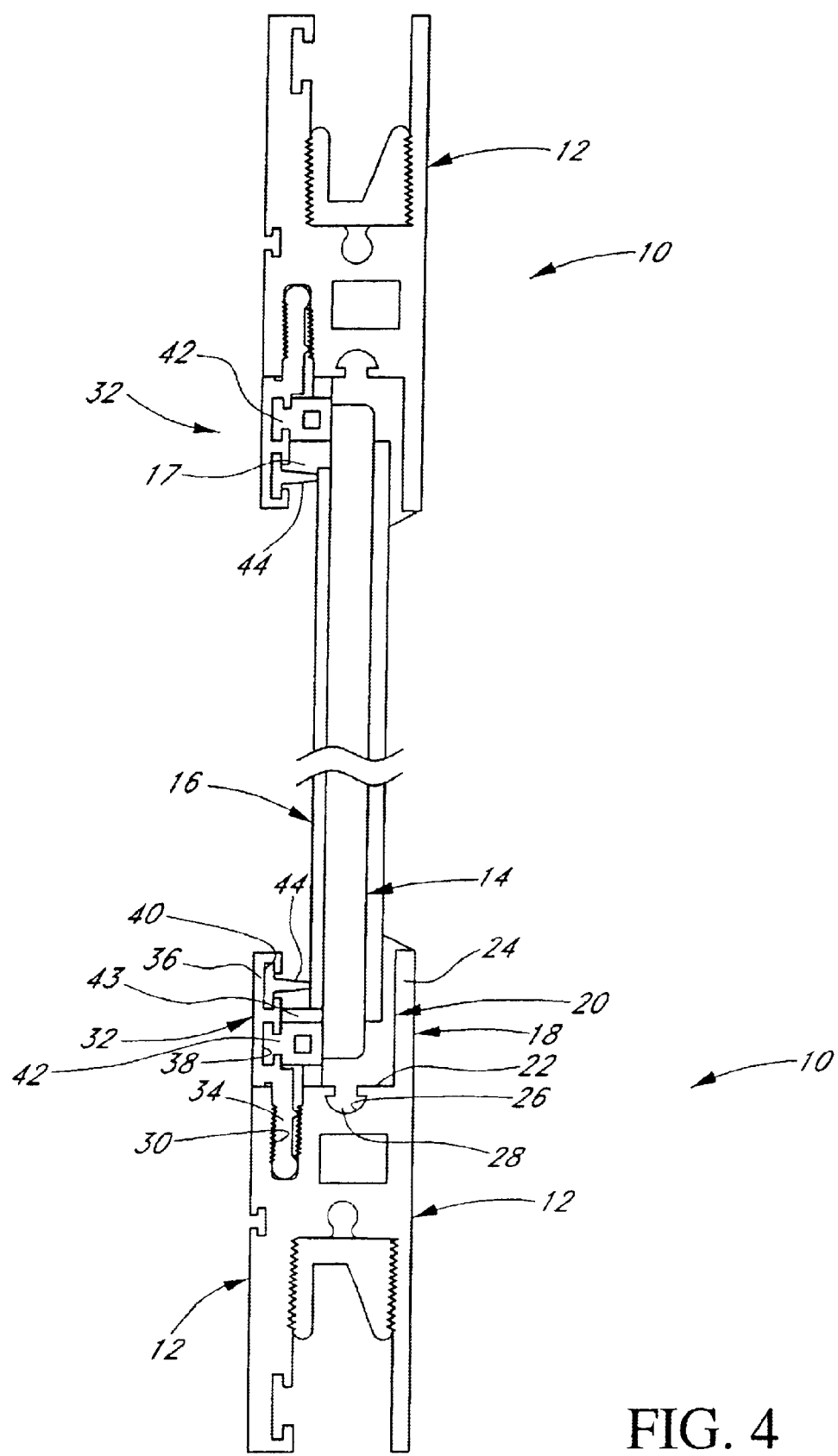
FIG. 4 is a sectional side view of a window assembly constructed in accordance with an alternate embodiment of the present invention.

Alternatively, a protective panel 16 could be installed into the window assembly 10 by providing a void in the upper edge of the window assembly 10, such as best seen in FIG. 4. In this alternate embodiment, the upper edge of the panel 16 may be inserted into the upper void 17, with the panel 16 being pushed between the glazing 14 and the protective panel gasket 44, into the void 17, until the lower edge of the protective panel 16 is raised sufficiently to pass over the retainer 32 and the protective panel 16 positioned adjacent the glazing 14. The protective panel 16 may then be pushed downward with the lower edge of the protective panel 16 passing between the protective panel gasket 44 and the glazing 14 in the previously-described manner, thus securing the retainer 32 into the frame 12.

As is illustrated in FIG. 4, in this embodiment, the upper window assembly 10 is substantially similar to the lower window assembly 10 in that it includes the frame member 12, the retainer 32, the window gasket 42 and the protective panel gasket 44. However, the upper window assembly 10, in this embodiment does not include the supplemental seal 43 in the space 17. Hence, there is space to allow the protective panel 16 to be moved with the suction cups (not shown) in the previously described manner so as to remove the lower edge of the protective panel 16 out from the space between the panel gasket 44 and the glazing 14.

Figure 5:
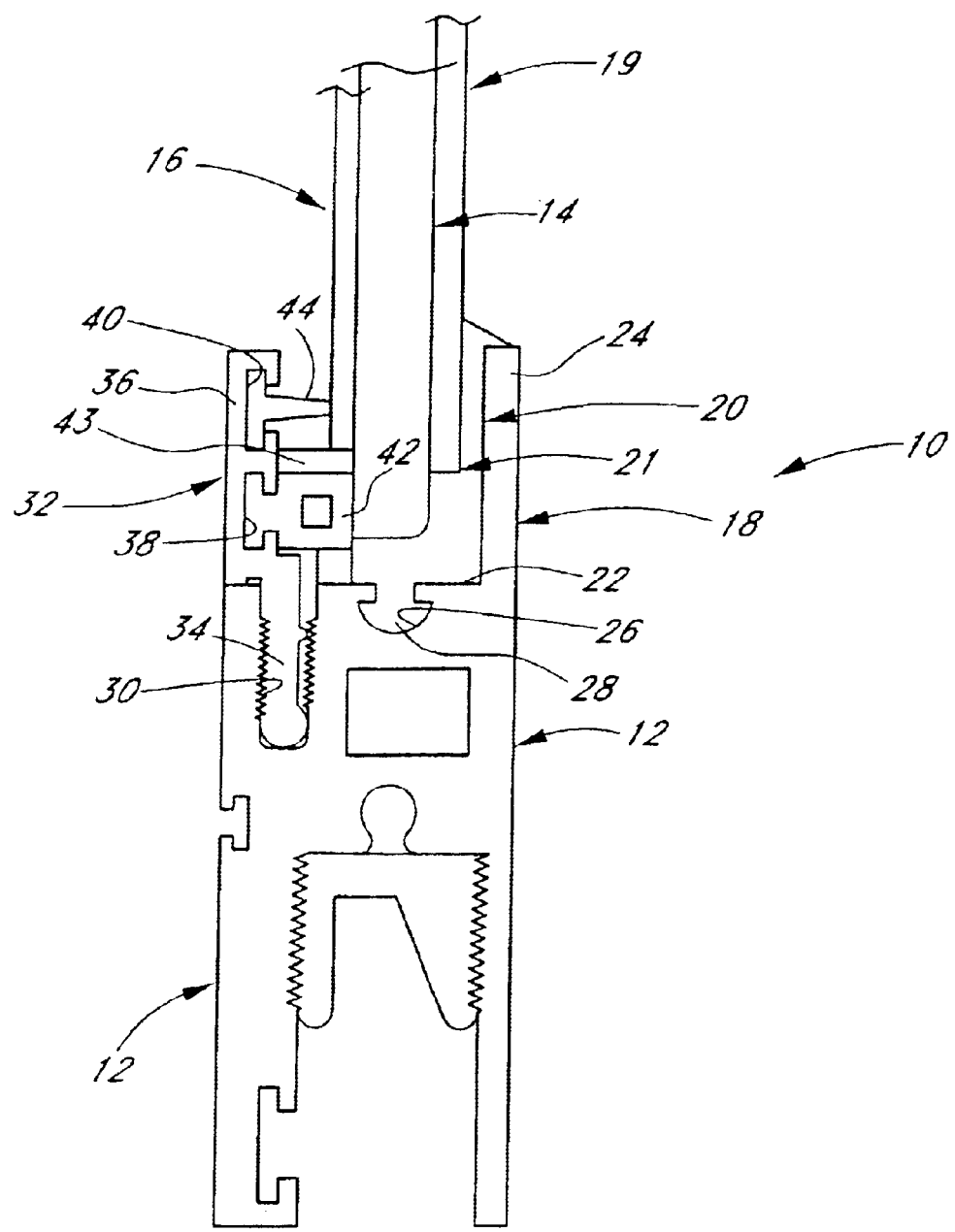
FIG. 5 is a sectional side view of a window assembly constructed in accordance with another alternate embodiment of the present invention.

FIG. 5 depicts a window assembly 10 constructed in accordance with an alternate embodiment of the present invention. Because the basic construction of this embodiment is essentially similar to the embodiments previously described, like reference numerals will be used for similar components.

In the embodiment of FIG. 5, the window assembly 10 incorporates both inner and outer protective panels 16 and 19. The outer protective panel 19 is desirably sandwiched between the glazing 14 and the L-shaped gasket 20, with an elongated notch 21 formed in the L-shaped gasket 20 to accommodate the outer edges of the outer protective panel 19.

Desirably, the outer protective panel 19 can be removed from the window assembly 10 by removing the glazing 14 in the previously-described manner and then removing the outer protective panel 19. In this manner, the inner protective panel 16 secures the window assembly 10 when desired, but allows the simple and easy removal of the inner and outer protective panels 16 and 19 and the glazing 14 when desired for maintenance.

One skilled in the art would appreciate that the disclosed window assembly, having outer and inner protective panels, could similarly be incorporated into a mass transit vehicle with the retainer members located on the outside of the window assembly, such that removal of the protective panels and retainer members could only be accomplished by individuals located outside of the vehicle. Such an arrangement would make it even more difficult for occupants of the vehicle to access and/or remove the retainer members from the window assembly, further limiting possible vandalism of the window frame assemblies while the vehicle is in operation.

From the foregoing description, it should be appreciated that the assembly and disassembly of the window assembly 10 and the attachment and removal of the protective panel 16 over the glazing 14 is easy and rapid. In particular, in assembly of the window assembly 10, the gasket 20 can be easily installed to the frame 12 via the channel 26 readying the frame 12 for reception of the glazing and any desired protective panels. With the glazing 14 and any outer protective panel in place, the retainer 32 is inserted into the frame 12 with the lower leg 34 of the retainer 32 seating in the pocket 30. The combination of frame 12, retainer 32 and gaskets 20 and 42 effects a positive weather seal. The inner protective panel 16 may then be inserted between the retainer 32 and the glazing 14, thereby securing the retainer 32 into the frame and inhibiting removal of the retainer 32 by non-maintenance personnel. In addition, the rigid surface of the retainer 32 facing towards the occupants of the vehicle desirably resists the effects of wear and/or vandalism, thereby significantly increasing the life of the window assembly 10. The removal of the glazing 14 is easily accomplished by removing the protective panel 16, removing the retainer 32 and then taking the glazing, i.e. glass, acrylic or other transparent and/or semi-transparent material, from the frame 12.

Figure 6:
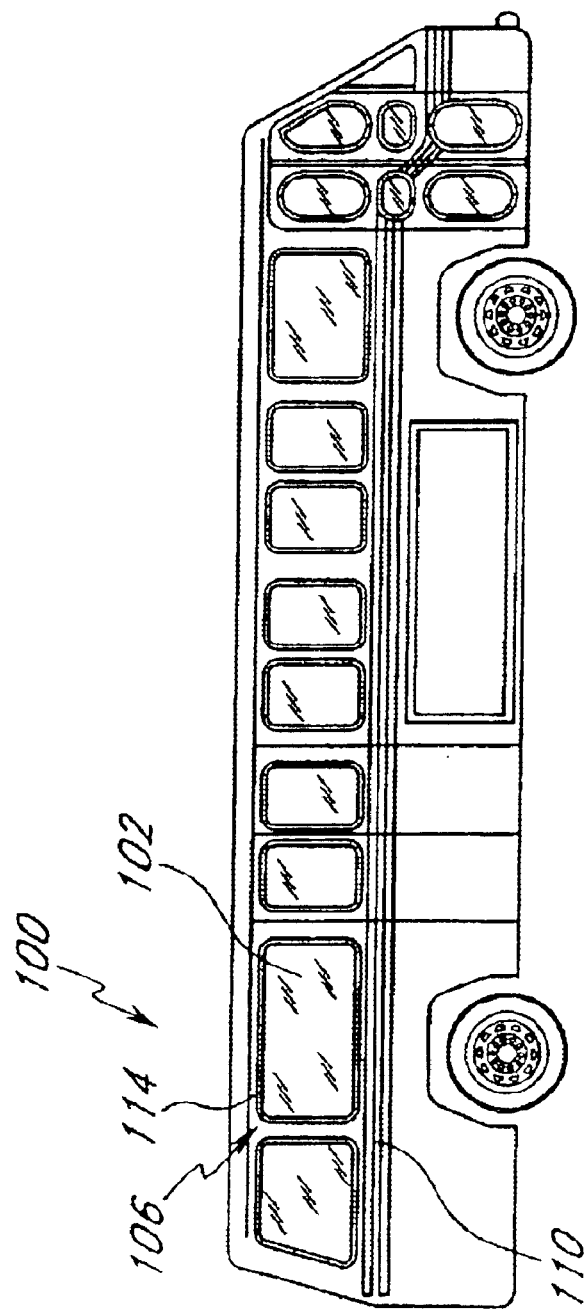
FIG. 6 is an elevational view illustrating a public transportation vehicle incorporating windows having an embodiment of a window protector assembly of the present invention.

FIG. 6 illustrates an exemplary public transportation vehicle 100 that incorporates windows 102 having window frames 114 mounted within openings 106 in the side wall 110 of the vehicle 100. It will be appreciated from the following discussion that, while the window protector assembly of this embodiment is described in connection with a bus, that the window protector assembly 112 can be used in a number of different applications including other types of public transportation vehicles and also in windows that are positioned in fixed environments, such as buildings, where the window is likely to be damaged or defaced due to vandalism or accident. As will be also apparent from the following discussion, the window protector assembly of the preferred embodiment is designed to both protect the glazing of the window and also to facilitate rapid change and replacement of protective sheets and the glazing of the window protector assembly.

Referring to FIG. 7, one embodiment of a window protector assembly 112 is illustrated. In this embodiment, the window protector assembly 112 incorporates a frame 114 that is adapted to mount within the opening 106 in the side wall 110 of the vehicle 100 in a well-known manner. The frame 114 defines an opening 116 into which one or more pieces of glazing 120 are to be positioned. As will be understood, the term "glazing" refers to either glass windows or windows formed of any other generally transparent or translucent material.

In this embodiment, a first retaining member 122 and a second retaining member 124 are pivotally mounted to the frame 114 so as to be positioned about the outer perimeter of the opening 116 in the frame 114. As is shown in FIG. 7, the first retaining member 122 is generally U-shaped having two arms 123a, 123b that extend along the side walls of the frame 114 and pivoting section 127. Similarly, the second retaining member 124 is also generally U-shaped having a pivoting section 128 and two arms 125a, 125b that also extend along the side walls of the frame 114 so as to engage with the two arms 123a, 123b of the first retaining member 122. The engagement between the arms 123a, 123b of the first retaining member 122 and the arms 125a, 125b of the second retaining member 124 secures the glazing and protective layers within the opening 116 of the frame 114 in a manner that will be described in greater detail below.

As will also be described in greater detail below in reference to FIGS. 10A and 10B, the pivoting section 127 of the first retaining member 122 and the pivoting section 128 of the second retaining member 124 are pivotally attached to the frame 114 so as to be pivotable between a closed position, as shown in, FIG. 7, and an opened position whereby the outer perimeter of the glazing 120 and any protective layer is exposed. As is shown in FIG. 7, the arms and pivoting sections of the first retaining member 122 and the second retaining member 124 are selected to have a width sufficient so as to fully cover the outer edge of the glazing 120 and any protective layers positioned within the opening 116 of the frame 114.

FIGS. 8A and 8B illustrate the interconnection between the first retaining member 122 and the second retaining member 124 and corresponding sections of the frame 114. In particular, as illustrated in FIGS. 8A and 8B, the frame 114 includes an upper frame section 130a and a lower frame section 130b. The upper and lower frame sections 130a, 130b have an L-shaped section 132 that is suitable for mounting in the opening 106 of the side wall 110 of the vehicle 100. In particular, the L-shaped section 132 has an exterior lip 134 that is adapted to mount flush against the outer surface of the side wall 110 of the vehicle adjacent the window openings 106. The L-shaped section 132 further includes a laterally extending member 136 that is adapted to be positioned adjacent the inner walls of the openings 106 in the side walls 110 of the vehicle so as to extend substantially through the opening 106.

A pivoting member 140 is formed on an inner wall 142 of the laterally extending member 136 so as to extend perpendicularly outward therefrom into the opening 116 defined by the frame 114. As will be described in greater detail below, the pivoting member 140 extends the full length of the upper frame section 130a and the lower frame section 130b, and provides a surface to which the pivoting section 127 of the first retaining member 122 and the pivoting section 128 of the second retaining member 124 can be respectively attached to the frame 114 of the window protector assembly 112.

The L-shaped section 132 also defines a seating member 144 that extends inward into the opening 116 defined by the window frame 114. The seating member 144 is adapted to receive a seal 146 that is retained in the seating member 144 as a result of a deformable section 150 of the seal 146 being positioned within an opening 152 formed in the seating member 144 of the upper and lower frame members 130a, 130b. Hence, the seal 146 is press-fit within the seating member 144 of the upper frame section 130a and lower frame section 130b. It will be appreciated that while the upper and lower frame sections 130a, 130b have been described as being comprised of a plurality of discrete components, in the illustrated embodiment, the upper frame section 130a and the lower frame section 130b are comprised of a single uniform component preferably formed of extruded or molded aluminum.

The pivoting members 140 are positioned on the inner surface 142 of the L-shaped section 132 so that the pivoting member 140 is positioned within the opening 116 of the window frame 114. The pivoting sections 127 and 128 of the retaining members 122 and 124 define an opening 141 that receives the pivoting member 140 to permit the pivoting movement of the retaining members 122 and 124. More particularly, the pivoting member 140 defines a ball 143 at its distal end that extends outwardly towards the outer surface of the window frame 114. Since the pivoting member 140 is positioned on the inside surface of the L-shaped section 132 of the frame 114, access to the interconnection between the retaining members 122 and 124 and the pivoting members is inhibited. Moreover, an end portion 145 of each of the retaining members 122, 124 is adapted to be flushly positioned within a recess 147 (FIGS. 8A and 8B) when the retaining members 122, 124 are in the closed position so that access to the interconnection between the retaining members 122, 124 is further inhibited. In this way, the likelihood of a person prying the retaining members 122, 124 free from the pivoting members 140 and thereby dismantling or damaging the window protector assembly 112 is inhibited.

As is illustrated in FIGS. 8A and 8B, the first retaining member 122 and the second retaining member 124 can be pivoted about the pivoting members 140 so as to extend outward from the opening 116. This allows a protective sacrificial sheet 156 to be positioned within the opening 116 on the seal 146. Subsequently, one or more pieces of glazing 120 can be positioned on an inner surface 160 of the protective sheet 156 in the manner shown in FIGS. 8A and 8B. Subsequently, an inner sacrificial protective sheet 162 can be positioned on an inner surface 164 of the glazing 120. The first and second retaining members 122, 124 can then be pivoted into the closed position as shown in FIG. 8B. The first and second retaining members 122, 124 further include an inner seal 166 which extends entirely around the perimeter of the opening 116 so that the inner seal 166 makes contact with the inner sacrificial protective sheet 162 in the manner shown in FIG. 8B.

FIG. 9 is a cross-sectional view which illustrates the side frame sections 170a, 170b of the frame 114. The side frame sections 170a, 170b are integrally connected to the upper and lower frame sections 130a, 130b so that the entire frame 114 is a single integral piece. The side frame sections 170a, 170b are also configured to have an L-shaped section 172 that has a side wall member 174 that is adapted to be flushly positioned against the outer side wall 110 of the vehicle 100 adjacent the window opening 106. The L-shaped section 172 also has a laterally extending section 176 that extends inward through the opening 116 of the frame 114 in the same manner as the laterally extending section 136 of the upper and lower frame sections 130a, 130b as described above. A bracing member 180 extends inwardly into the opening 116 of the frame 114 so as to provide a bracing contact so that the first and second retaining members 122, 124 will be positioned adjacent the bracing member 180 when the retaining members 122, 124 are in the closed position. As is also illustrated in FIG. 9, the side frame sections 170a, 170b include a seating member 184 that extends inward into the opening 116 from the inner surface 182 of the laterally extending section 176. The seating member 184 is adapted to receive one or more seals 186 that extend laterally around the perimeter of the window.

As illustrated in FIGS. 8A and 9, the protective sacrificial sheet 156 is positioned adjacent a seal 186 which is retained in the side frame members 170a, 170b in substantially the same manner as discussed above in connection with the seal 146 and the upper and lower frame members 130a, 130b. The glazing 120 is then positioned adjacent the outer sacrificial layer 156 and the inner protective sheet 162 is then positioned adjacent the inner surface 164 of the glazing 120 in the same manner as described above in connection with FIGS. 8A and 8B. As illustrated in FIG. 9, when the first and second pivoting retaining members 122, 124 are in the closed position, the one or more seals 166, are positioned adjacent the inner sacrificial protective sheet 162. In one embodiment, the window 110 is square in which case the seals are comprised of a plurality of pieces. In another embodiment, the window 110 is curved and the seals comprise a single seal.

Figure 10A:
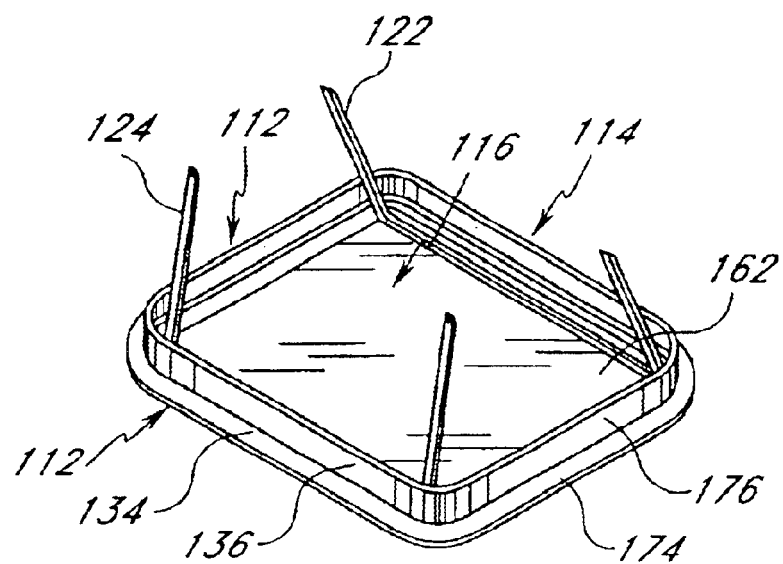
FIGS. 10A and 10B are perspective views of the window protector assembly of FIG. 7, illustrating the assembly in both a closed and an opened configuration.
Figure 10B:
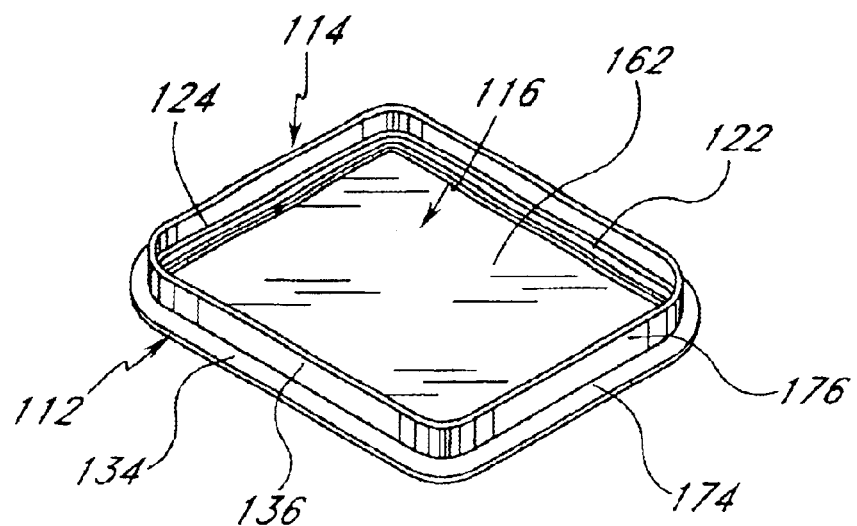

As is shown in FIGS. 7, 10A and 10B, the frame 114 is comprised of a single uniform piece that is comprised of the upper and lower sections 130a, 130b and the side sections 170a, 170b. The retaining members 122, 124 are pivotally attached and define retaining surfaces that extend about the outer perimeter of the opening 116 defined by the frame 114 so as to overlap the outer perimeter of the glazing 120 and the protective sheets 156, 162. The seating member 144 of the upper and lower frame sections 130a, 130b and the seating member 184 of the side frame sections 170a, 170b also extend into the opening 116 defined by the frame 114 so that the protective sheets 156, 162 and the glazing 120 can be securely retained in the opening 116 of the frame 114 by the retaining members 122, 124 pressing the protective sheets 156, 162 and the glazing 120 against the seating members 144, 184 about substantially the entire perimeter of the glazing 120 and the protective sheets 156, 162.

FIGS. 10A and 10B further illustrate the configuration and operation of the window protector assembly 112. In particular, as illustrated in FIG. 10A, the first and second retaining members 122, 124 are pivotable with respect to the upper and lower frame sections 130a and 130b thereby removing the first and second retaining members 122, 124 from the outer perimeter of the outer sacrificial layer 156, the glazing 120, and the inner sacrificial layer 162. This allows each of these layers to be lifted out of the opening 116 defined by the frame 114.

As shown in FIG. 10B, when the first and second retaining members 122, 124 are closed, they are positioned about the outer perimeter of the outer protective layer 156, the glazing 120 and the inner protective layer 162 thereby capturing these three layers adjacent the seal positioned on the inner sections of the frame 114. As the outer perimeter of the sacrificial protective layers 156, 162 and the glazing 120 is covered by the pivoting retaining members 122, 124, these layers cannot be removed without moving the first and second retaining members 122, 124 into the open position illustrated in FIGS. 8A and 10A. In this embodiment, the sacrificial protective layers 156 and 162 are comprised of an acrylic material that is adapted to be positioned adjacent the exposed surfaces of the glazing 120 such that the exposed surfaces of the glazing 120 on both the inside and the outside of the window is covered by the protective layers 156, 162. In this way, damage to the more expensive glazing 120 as a result of vandalism or defacement is inhibited as the protective acrylic layers provide protection against such damage.

Figure 11A:
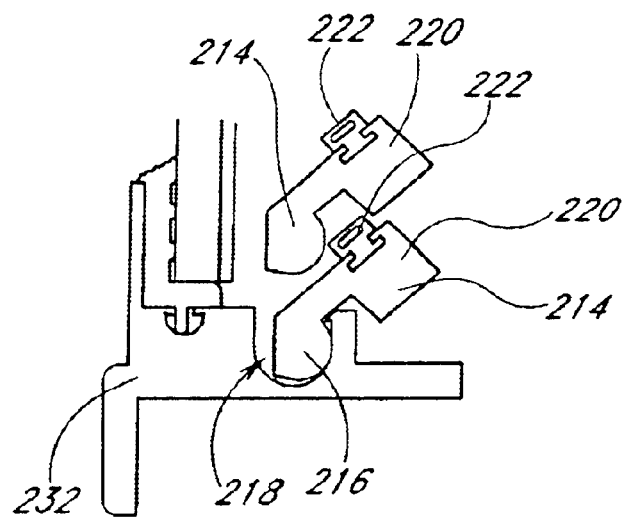
FIGS. 11A and 11B are cross-sectional views of another embodiment of the window protector assembly of FIG. 7 illustrating another interconnection between retaining members of the window protector assembly and the frame of the window protector assembly.
Figure 11B:
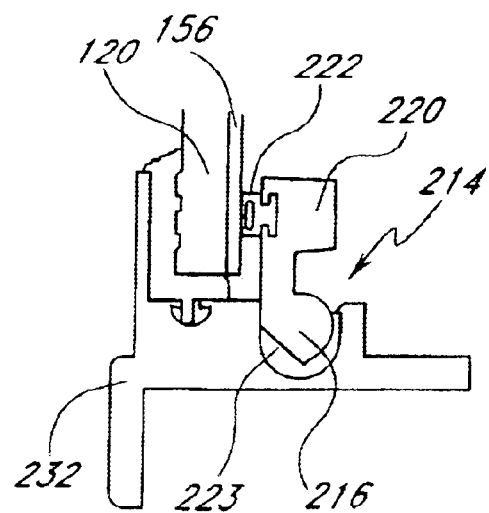

FIGS. 11A and 11B illustrate an alternate embodiment of the retaining members and their attachment to the frame of the window frame assembly. In particular, FIGS. 11A and 11B illustrate an alternate embodiment of the portions 127, 128 of the retaining members 122, 124 that pivotally attach the retaining members to the window frame. Specifically, in this embodiment, a retaining member 214 has a ball 216 formed on a first end that is adapted to be positioned within a recess 218 formed on an L-shaped section 232 of the frame. The embodiment of FIG. 11A and 11B is substantially similar to the embodiment of FIGS. 8A and 8B except that the retaining members in this embodiment have the rotatable ball formed thereon and the recess is formed in the L-shaped section 232 of the frame as opposed to the other way around as described above in connection with FIGS. 8A and 8B.

As is also illustrated in FIGS. 11A and 11B, the retaining member has a seal portion 220 that receives a seal 222. The ball portion 216 is rotatable within the recess 218 between an open and a closed position. In the closed position, the radius of the ball 216 prevents removal of the retaining member 214 from the recess 218. However, the ball 218 has a flat surface 223 that decreases the radius of the ball 216 with respect to the opening of the recess 218 when the retaining member 214 has been moved to the open position as shown in FIG. 11A. Hence, the retaining member can be fully removed from engagement with the frame thereby permitting easy removal and installation of the retaining members.

When the retaining members are in the closed position, a securing mechanism, such as the mechanism illustrated in FIGS. 12 and 13 hereinafter can be used to secure the retaining members in the closed position. In the closed position, the seal 222 engages with the inner protective sheet 156 so as to secure the protective sheets and glazing within the window frame in substantially the same manner as described above.

Figure 12:
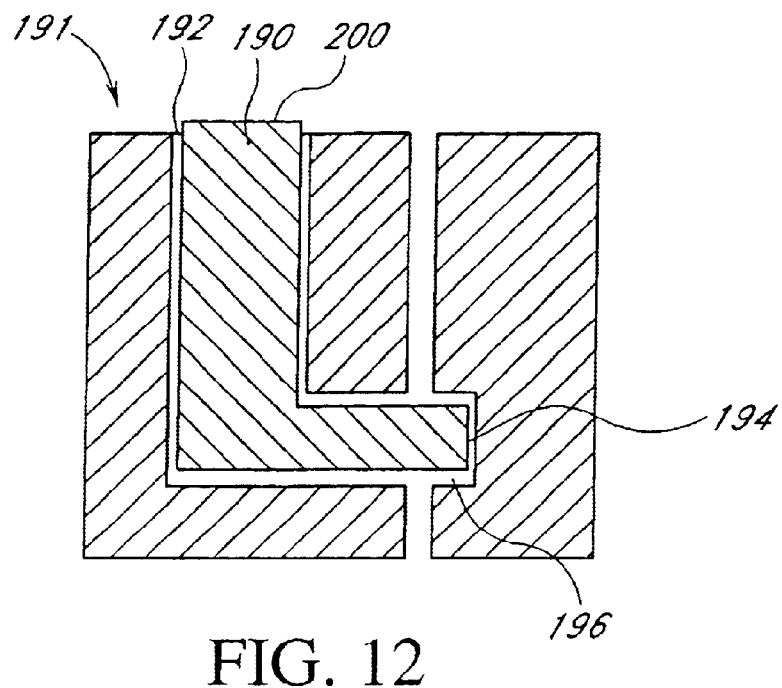
FIG. 12 is a side cross-sectional view of a securing mechanism of the assembly of FIG. 7.

FIG. 12 illustrates a securing mechanism 191 that is adapted to secure the first and second retaining members 122, 124 in a locked and closed position. In particular, as illustrated in FIGS. 8A and 8B, the outer edge of the arms 123a, 123b of the first retaining member 122 and outer edge of the arms 125a, 125b of the second retaining member 124 are beveled so that the outer tip 183 of the arms 125a, 125b of the second retaining member 124 is positioned over the outer tip 185 of the arms 123a, 123b of the first retaining member 122 when the first and second retaining members are positioned in the closed position in the manner shown in FIGS. 8B and 10B. A securing member 190 is positioned within an opening 192 in both the arms 125a, 125b of the second retaining member 124. Preferably, the securing member 190 is pivotable within the opening 192 such that a laterally extending arm 194 of the securing member 190 can be positioned within an opening 196 formed in a side wall of the frame 114.

In this embodiment, the opening 196 is preferably formed in the bracing member 180 and has a curved opening to permit the extending arm 194 to be rotated into the opening 196 in response to the user turning the securing member 190. As illustrated in FIG. 13, the securing member 190 is preferably pivotable between an opened position and a closed position wherein the laterally extending member 194 is positioned within the opening 196 and the frame 114 in the closed position and is retracted from the opening 196 in the opened position.

Figure 13:
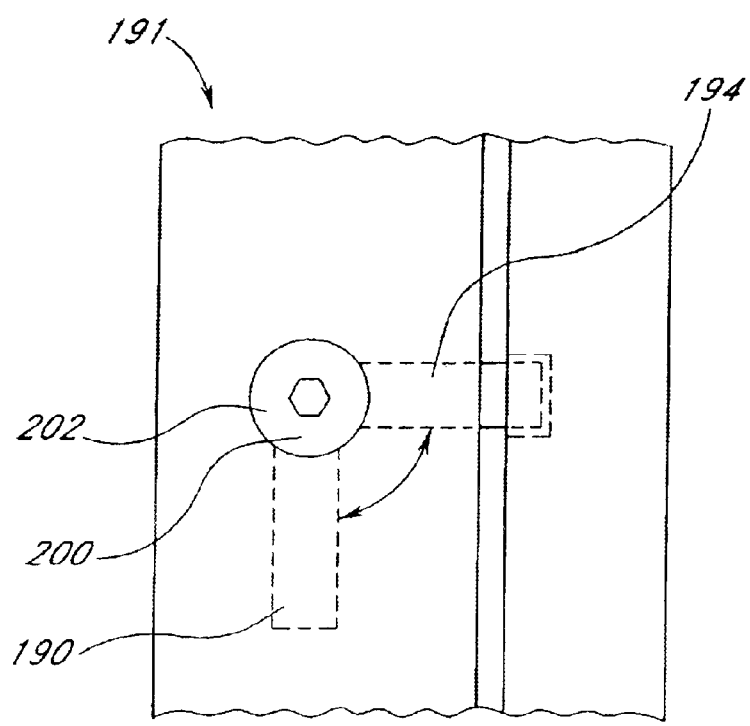
FIG. 13 is a top view of the securing mechanism of FIG. 7.

As is also illustrated in FIG. 13, the outer face 200 of the securing member 190 includes a tool recess 202 that is adapted to receive only a specially configured tool (not shown) such that manipulation of the securing member 190 between the opened and closed positions can preferably only be accomplished by an authorized person possessing a specially configured tool. As is illustrated in FIG. 7, there are preferably two securing members 190 positioned in both of the outer ends of the arms 125a, 125b of the second retaining member 124 to secure the second retaining member 124 in the closed position adjacent the frame 114. As discussed above, because the outer end 183 of the second retaining member 124 overlaps the outer end 185 of the first retaining member 122, securing the second retaining member 124 in the closed position against the frame 114 in the manner shown in connection with FIGS. 12 and 13 results in the first retaining member 122 similarly being secured in the closed position.

Advantageously, it is simple to remove and replace the inner sacrificial layer 162 and the outer sacrificial layer 156 and the glazing 120 by simply manipulating the retaining members 122, 124 into the open position and extracting each of the layers positioned within the opening 116 of the frame 114. Hence, the window protector assembly 112 of the illustrated embodiment allows for simpler and easier replacement of the protective layers 156, 162 and the glazing 120 as compared to similar protective devices of the prior art. As a result of permitting such easy access and replacement, it is now possible to have a protective layer positioned on the outer surface of the glazing 120 in addition to a protective surface on the inner surface of the glazing 120. However, it will also be appreciated that the window frame and protector 112 of the present invention can be used with only an inner protective layer 162 without departing from the spirit of the present invention.

Hence, the window protector 112 of the present invention allows for easier replacement of protective sheets as compared to window protective devices of the prior art. This easier access facilitates the use of a protective layer on the outside surface of the glazing as replacement of this sheet is now simplified due to the ease of access provided by the window protector assembly of the preferred embodiment.

Figure 14:
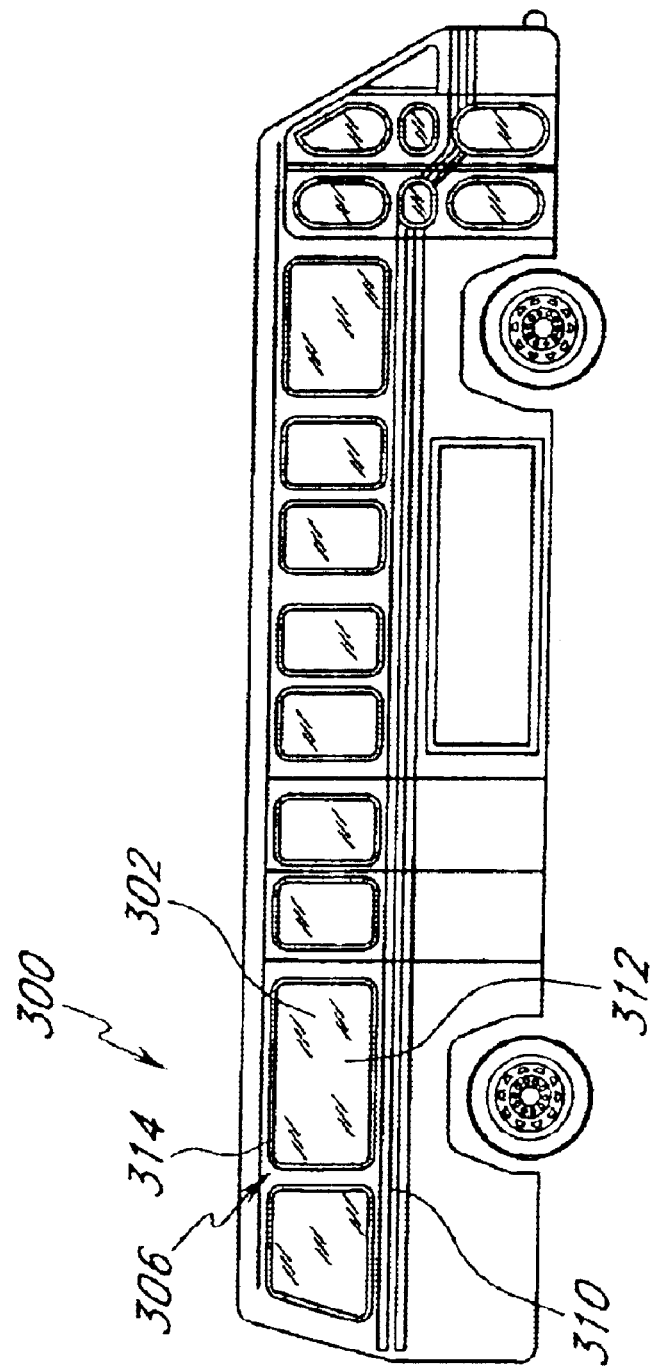
FIG. 14 is an elevational view of another embodiment of a public transportation vehicle incorporating windows having another embodiment of a window protector assembly of the present invention.

FIG. 14 illustrates another embodiment of an exemplary public transportation vehicle 300 that incorporates windows 302 having window frames 314 mounted within openings 306 in the side wall 310 of the vehicle 300. It will be appreciated from the following discussion that, while the window protector assembly of this embodiment is described in connection with a bus, that the window protector assembly 312 can be used in a number of different applications. These applications include other types of public transportation vehicles and also windows that are positioned in fixed environments, such as buildings, where the window is likely to be accidentally or intentionally damaged or defaced. As will also be apparent from the following discussion, the window protector assembly of the preferred embodiment is designed to both protect the glazing of the window and also to facilitate rapid change and replacement of protective sheets and the glazing of the window protector assembly.

FIG. 15 illustrates one embodiment of a window protector assembly 312. In this embodiment, the window protector assembly 312 incorporates a frame 314 that is adapted to mount within the opening 306 in the side wall 310 of the vehicle 300 in a well-known manner. The frame 314 defines an opening 316 into which one or more pieces of glazing 320 are to be positioned.

In this embodiment, a first retaining member 322 and a second retaining member 324 are pivotally mounted to the frame 314 so as to be positioned about the outer perimeter of the opening 316 in the frame 314. As is shown in FIG. 15, the first retaining member 322 is generally U-shaped having two arms 323a, 323b that extend along the side walls of the frame 314 and pivoting section 327. Similarly, the second retaining member 324 is also generally U-shaped having a pivoting section 328 and two arms 325a, 325b that also extend along the side walls of the frame 314 so as to engage with the two arms 323a, 323b of the first retaining member 322. The engagement between the arms 323a, 323b of the first retaining member 322 and the arms 325a, 325b of the second retaining member 324 secures the glazing and protective layers within the opening 316 of the frame 314 in a manner that will be described in greater detail below.

As will also be described in greater detail below in reference to FIGS. 18A and 18B, the pivoting section 327 of the first retaining member 322 and the pivoting section 328 of the second retaining member 324 are pivotally attached to the frame 314 so as to be pivotable between a closed position, as shown in FIGS. 15 and 17, and an opened position, as shown in FIG. 16A.

As is illustrated in FIGS. 15 and 16B, the retaining members 322, 324 open outward of the window so as to secure the glazing in the window frame. When the glazing is to be replaced, the retaining members 322, 324 are opened and the glazing is then removed towards the outside of the vehicle in the manner that will be described in greater detail hereinbelow, thereby greatly simplifying the replacement of damaged or defaced glazing.

As is shown in FIG. 15, when the retaining members 322, 324 are in a closed position, the retaining members 322, 324 cover the outer perimeter of the glazing 320 and any outer protective member. This is because the arms and pivoting sections of the retaining members 322, 324 are selected to have a width sufficient so as to fully cover the outer edge of the glazing 320 and any outer protective layers positioned within the opening 316 of the frame 314. As is shown in FIG. 17, when the retaining members 322, 324 are in an open position, the outer perimeter of the glazing 320 and any outer protective layer is exposed. With the outer perimeter of the glazing 320 exposed, the glazing 320 can be removed from the frame via the exterior surface of the vehicle in a known manner.

FIGS. 16A and 16B illustrate the interconnection between the first retaining member 322 and the second retaining member 324 and corresponding sections of the frame 314. In particular, as illustrated in FIGS. 16A and 16B, the frame 314 includes an upper frame section 330a and a lower frame section 330b. The upper and lower frame sections 330a, 330b have an L-shaped section 332 that is suitable for mounting in the opening 306 of the side wall 310 of the vehicle 300. In particular, the L-shaped section 332 has an exterior lip 334 that is adapted to mount flush against the outer surface of the side wall 310 of the vehicle adjacent the window openings 306. The L-shaped section 332 further includes a laterally extending member 336 that is adapted to be positioned adjacent the inner walls of the openings 306 in the side walls 310 of the vehicle so as to extend substantially through the opening 306.

A pivoting member 340 is formed on an inner wall 342 of the laterally extending member 336 so as to extend perpendicularly outward therefrom into the opening 316 defined by the frame 314. As will be described in greater detail below, the pivoting member 340 extends the full length of the upper frame section 330a and the lower frame section 330b, and provides a surface to which the pivoting section 327 of the first retaining member 322 and the pivoting section 328 of the second retaining member 324 can be respectively attached to the frame 314 of the window protector assembly 312.

The L-shaped section 332 also defines a seating member 344 that extends inward into the opening 316 defined by the window frame 314. The seating member 344 is adapted to receive a seal 346 that is retained in the seating member 344 as a result of a deformable section 350 of the seal 346 being positioned within an opening 352 formed in the seating member 344 of the upper and lower frame members 330a, 330b. Hence, the seal 346 is press-fit within the seating member 344 of the upper frame section 330a and the lower frame section 330b. The glazing 320 is preferably positioned within frame 314 so as to be positioned adjacent the seal 346. When the retainers 322, 324 are closed, the glazing 320 is compressed against the seal 346 such that the glazing seals the window so as to inhibit the entry of moisture or air from the outside environment into the interior of the vehicle. It will be appreciated that while the upper and lower frame sections 330a, 330b have been described as being comprised of a plurality of discrete components, in the illustrated embodiment, the upper frame section 330a and the lower frame section 330b are comprised of a single uniform component preferably formed of extruded or molded aluminum.

The pivoting members 340 are positioned on the inner surface 342 of the L-shaped section 332 so that the pivoting member 340 is positioned within the opening 316 of the window frame 314. The pivoting sections 327 and 328 of the retaining members 322 and 324 define an opening 341 that receives the pivoting member 340 to permit the pivoting movement of the retaining members 322 and 324. More particularly, the pivoting member 340 defines a ball 343 at its distal end that extends outwardly toward the center of the window 302. Since the pivoting member 340 is positioned on the inside surface of the L-shaped section 332 of the frame 314, access to the interconnection between the retaining members 322 and 324 and the pivoting member 340 is inhibited. Moreover, an end portion 345 of each of the retaining members 322, 324 is adapted to be flushly positioned within a recess 347 (FIGS. 16A and 16B) when the retaining members 322, 324 are in the closed position so that access to the interconnection between the retaining members 322, 324 is further inhibited. In this way, the likelihood of a person prying the retaining members 322, 324 free from the pivoting member 340 and thereby dismantling or damaging the window protector assembly 312 is inhibited.

As is illustrated in FIGS. 16A and 16B, the first retaining member 322 and the second retaining member 324 can be pivoted about the pivoting members 340 so as to extend outward from the opening 316. This allows one or more pieces of glazing 320 to be positioned within the opening 316 on the seal 346. Subsequently, an outer sacrificial protective sheet 362 can be positioned on an outer surface 364 of the glazing 320. The first and second retaining members 322, 324 can then be pivoted into the closed position as shown in FIG. 16B. The first and second retaining members 322, 324 further include an inner seal 366 which extends entirely around the perimeter of the opening 316 so that the inner seal 366 makes contact with the outer sacrificial protective sheet 362. Once contact is made between the seal 366 and the outer sacrificial protective sheet 362, the outer sacrificial protective sheet 362 in turn contacts the glazing 320 which contacts the seal 346 which is rigidly attached to the rest of the frame 314. Thus, by closing the retaining members 322, 324, the outer sacrificial protective sheet 362 and the glazing 320 are held rigidly inside the frame 314. However, it will be appreciated that both the outer sacrificial protective sheet 362 and the glazing are easily removable once the retaining members 322, 324 are opened.

Advantageously, because the retaining members 322, 324 open only to the outside of the vehicle, passengers would be unable to open the retaining members 322, 324. This significantly reduces the abilities of a vandal to dismantle or damage the window protector assembly 312 from the inside of the vehicle, where vandalism is most likely to occur. Furthermore, passengers would be unable to open the retaining members 322, 324 to gain access to the fragile and expensive glazing 320. Hence, because the retaining members 322, 324 open only to the outside, the cost of repairing the effects of vandalism is decreased while the safety of the other passengers is increased.

Furthermore, as illustrated in FIGS. 16A and 16B, the upper and lower frame sections 330a, 330b include an upper and lower flange 355a, 355b that extends toward the center of the opening 316 defined by the window frame 314. The upper and lower flanges 355a, 355b are positioned on the interior surface of the window frame 314, lying parallel to the seating member 344 and to the plane of the glazing 320. The upper and lower flanges 355a, 355b are separated from the seating member 344 by a distance 360 so as to define an upper and lower recess 359a, 359b.

In the preferred embodiment of the window protector assembly 312, an inner sacrificial protective sheet 356 resides in the upper and lower recesses 359a, 359b. To install the inner sacrificial sheet 356, the inner sacrificial protective sheet 356 should be flexible enough such that the edges of the inner sacrificial protective sheet 356 can be bent over the upper and lower flanges 355a, 355b and into the upper and lower recesses 359a, 359b without breaking.

In one embodiment, a gasket 351 is positioned on the bottom surface 357 inside the lower recess 359b. Preferably, the gasket 351 is of such a thickness that it centers the inner sacrificial protective sheet 356 inside the window protector assembly 312. Also in this embodiment, one or more retainer fasteners 353 are drilled perpendicularly through the upper flange 355a, at a location above the upper edge 349a of the inner sacrificial protective sheet 356. Preferably, the retainer fasteners 353 lie close enough to the upper edge 349a such that the retainer bolts 353 prevent the inner sacrificial protective sheet 356 from shifting inside the recess 359. Also in the preferred embodiment, the fasteners 353 are removable only with a special tool such that a passenger would not be able to remove the fasteners 353 easily.

Preferably, the distance measured between a lower edge 349b of the inner sacrificial protective sheet 356 to the top of the lower flange 355b is less than the distance measured between an upper edge 349a of the inner sacrificial protective sheet 356 to the base of the upper flange 355a. Thus, after the retainer fasteners 353 are removed, the inner sacrificial protective sheet 356 can be shifted upwards until the lower edge 349b of the inner sacrificial protective sheet 356 is exposed. Then, in order to remove the inner sacrificial protective sheet 356 from the window protection assembly 312, the lower edge 349b could be grasped in order to bend the inner sacrificial protective sheet 356 out of the upper and lower recesses 359a, 359b. Advantageously, this embodiment of the widow protector assembly 312 allows for quick installation and removal of the inner sacrificial protective sheet 356, yet the addition of the fasteners 353 prevents a passenger from shifting and removing the protective sheet 356.

FIG. 17 is a cross-sectional view illustrating the side frame sections 370a, 370b of the frame 314. The side frame sections 370a, 370b are integrally connected to the upper and lower frame sections 330a, 330b so that the entire frame 314 is a single integral piece. The side frame sections 370a, 370b are configured to have an L-shaped section 372 that has a side wall member 374 that is adapted to be flushly positioned against the outer side wall 310 of the vehicle 300 adjacent the window opening 306. The L-shaped section 372 also has a laterally extending section 376 that extends inward through the opening 316 of the frame 314 in the same manner as the laterally extending section 336 of the upper and lower frame sections 330a, 330b as described above. As is also illustrated in FIG. 17, the side frame sections 370a, 370b include a seating member 384 that extends inward into the opening 316 from the inner surface 382 of the laterally extending section 376. The seating member 384 is adapted to receive one or more seals 386 that extend laterally around the perimeter of the window. Finally, as illustrated in FIG. 17, the side frame sections 370a, 370b include a flange 378 that extends inward into the opening 316 from the inner surface 382 of the laterally extending section 376. The flange 378 extends parallel to the seating member 384, and the flange 378 and the seating member 384 are separated at a distance 379 to define a recess 375.

As illustrated in FIGS. 16A and 17, the glazing 320 is positioned adjacent a seal 386 which is retained in the side frame members 370a, 370b in substantially the same manner as discussed above in connection with the seal 346 and the upper and lower frame members 330a, 330b. The outer sacrificial layer 362 is then positioned adjacent the glazing 320 in the same manner as described above in connection with FIGS. 16A and 16B. As illustrated in FIG. 17, when the first and second pivoting retaining members 322, 324 are in the closed position, the one or more seals 366, are positioned adjacent the outer sacrificial protective sheet 362. In one embodiment, the window 310 is square in which case the seals are comprised of a plurality of pieces. In another embodiment, the window 310 is curved and the seals comprise a single seal.

Also as illustrated in FIGS. 16A and 17, the inner sacrificial protective sheet 356 is positioned inside the recess 375 in the same manner as described above in connection with the upper and lower recesses 359a, 359b. In addition, a gasket 377 resides inside the recess 375 in order to center the inner sacrificial protective sheet 356 in the window protector assembly 312.

Figure 18A:
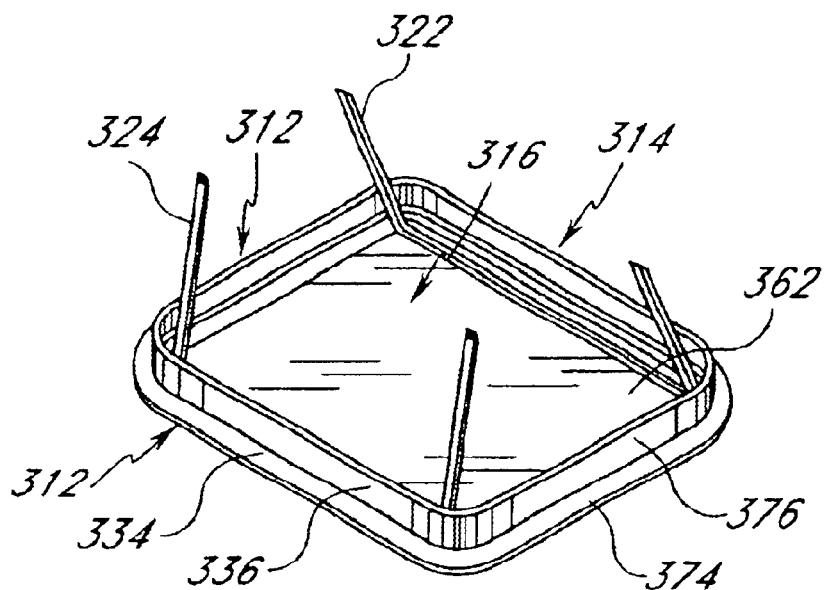
FIGS. 18A and 18B are perspective views of the window protector assembly of FIG. 15, illustrating the assembly in both a closed and an opened configuration.
Figure 18B:
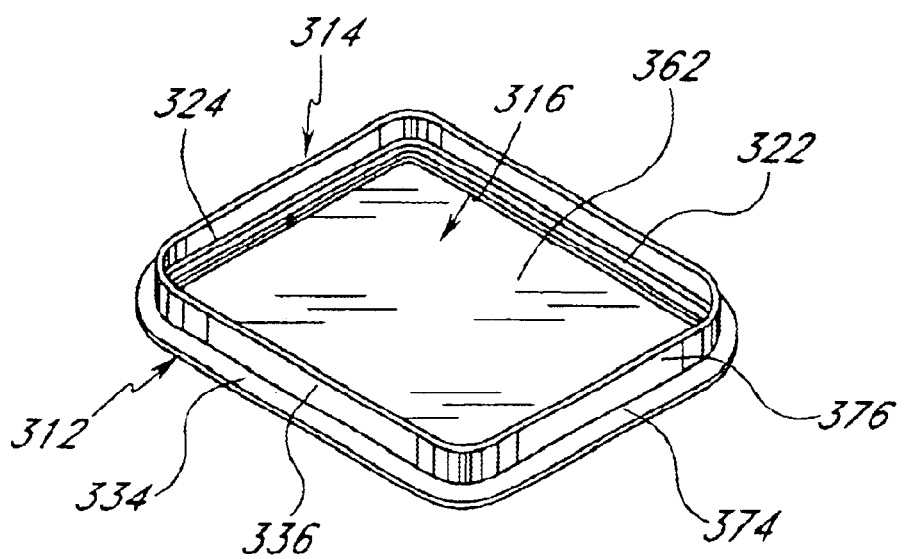

As is shown in FIGS. 15, 18A and 18B, the frame 314 is comprised of a single uniform piece that is comprised of the upper and lower sections 330a, 330b and the side sections 370a, 370b. The retaining members 322, 324 are pivotally attached and define retaining surfaces that extend about the outer perimeter of the opening 316 defined by the frame 314 so as to overlap the outer perimeter of the glazing 320 and the outer protective sheet 362. The seating member 344 of the upper and lower frame sections 330a, 330b and the seating member 384 of the side frame sections 370a, 370b also extend into the opening 316 defined by the frame 314 so that the outer protective sheet 362 and the glazing 320 can be securely retained in the opening 316 of the frame 314 by the retaining members 322, 324 pressing the outer protective sheet 362 and the glazing 320 against the seating members 344, 384 about substantially the entire perimeter of the glazing 320 and the protective sheet 362.

FIGS. 18A and 18B further illustrate the configuration and operation of the window protector assembly 312. In particular, as illustrated in FIG. 18A, the first and second retaining members 322, 324 are pivotable with respect to the upper and lower frame sections 330a and 330b thereby removing the first and second retaining members 322, 324 from the outer perimeter of the outer sacrificial layer 362 and the glazing 320. This allows each of these layers to be lifted out of the opening 316 defined by the frame 314.

As shown in FIG. 18B, when the first and second retaining members 322, 324 are closed, they are positioned about the outer perimeter of the outer protective layer 362 and the glazing 320 thereby capturing these two layers adjacent the seal positioned on the inner sections of the frame 314. As the outer perimeter of the sacrificial protective layer 362 and the glazing 320 is covered by the pivoting retaining members 322, 324, these layers cannot be removed without moving the first and second retaining members 322, 324 into the open position illustrated in FIGS. 16A and 18.

In this embodiment, the sacrificial protective layers 356 and 362 are comprised of an acrylic material that is adapted to be positioned adjacent the exposed surfaces of the glazing 320 such that the exposed surfaces of the glazing 320 on both the inside and the outside of the window is covered by the protective layers 356, 362. In this way, damage to the more expensive glazing 320 as a result of vandalism or accident is inhibited as the protective acrylic layers provide protection against such damage.

It should be noted that the alternate embodiment of the retaining members and their attachment to the frame described supra and illustrated in FIGS. 11A and 11B can be fully incorporated into this alternate embodiment of the window protector assembly 312.

Figure 19:
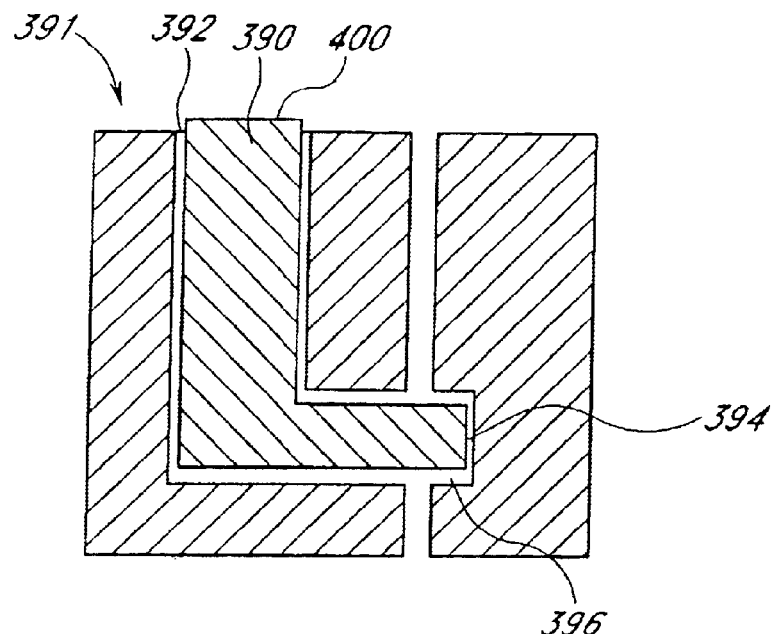
FIG. 19 is a side cross-sectional view of a securing mechanism of the assembly of FIG. 15.

FIG. 19 illustrates a securing mechanism 391 that is adapted to secure the first and second retaining members 322, 324 in a locked and closed position. In particular, as illustrated in FIGS. 16A and 16B, the outer edge of the arms 323a, 323b of the first retaining member 322 and outer edge of the arms 325a, 325b of the second retaining member 324 are beveled so that the outer tip 383 of the arms 325a, 325b of the second retaining member 324 is positioned over the outer tip 385 of the arms 323a, 323b of the first retaining member 322 when the first and second retaining members are positioned in the closed position in the manner shown in FIGS. 16 and 18. A securing member 390 is positioned within an opening 392 in both the arms 325a, 325b of the second retaining member 324. Preferably, the securing member 390 is pivotable within the opening 392 such that a laterally extending arm 394 of the securing member 390 can be positioned within an opening 396 formed in a side wall of the frame 314.

Figure 20:
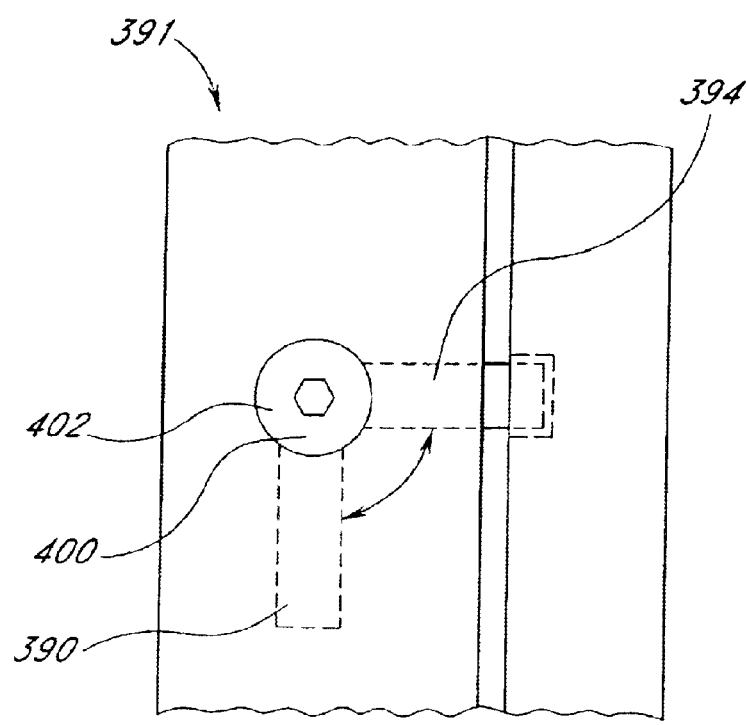
FIG. 20 is a top view of the securing mechanism of FIG. 15.

In this embodiment, the opening 396 is preferably formed in the bracing member 380 and has a curved opening to permit the extending arm 394 to be rotated into the opening 396 in response to the user turning the securing member 390. As illustrated in FIG. 20, the securing member 390 is preferably pivotable between an opened position and a closed position wherein the laterally extending member 394 is positioned within the opening 396 and the frame 314 in the closed position and is retracted from the opening 396 in the opened position.

As is also illustrated in FIG. 20, the outer face 400 of the securing member 390 includes a tool recess 402 that is adapted to receive only a specially configured tool (not shown) such that manipulation of the securing member 390 between the opened and closed positions can preferably only be accomplished by an authorized person possessing a specially configured tool. As is illustrated in FIG. 15, there are preferably two securing members 390 positioned in both of the outer ends of the arms 325a, 325b of the second retaining member 324 to secure the second retaining member 324 in the closed position adjacent the frame 314. As discussed above, because the outer end 383 of the second retaining member 324 overlaps the outer end 385 of the first retaining member 322, securing the second retaining member 324 in the closed position against the frame 314 in the manner shown in connection with FIGS. 19 and 15 results in the first retaining member 322 similarly being secured in the closed position.

Advantageously, it is simple to remove and replace the outer sacrificial layer 362 and the glazing 320 by simply manipulating the retaining members 322, 324 into the open position and extracting each of the layers positioned within the opening 316 of the frame 314. Likewise, it is simple to remove and replace the inner sacrificial layer 356 by shifting the sacrificial layer 356 until its edge 349b is exposed and then grasping the edge 349b and pulling on it until the sacrificial layer 356 bends out of the recesses 359a, 359b, 375. Hence, the window protector assembly 312 of the illustrated embodiment allows for simpler and easier replacement of the protective layers 356, 362 and the glazing 320 as compared to similar protective devices of the prior art. As a result of permitting such easy access and replacement, it is now possible to have a protective layer positioned on the outer surface of the glazing 320 in addition to a protective surface on the inner surface of the glazing 320. However, it will also be appreciated that the window frame and protector 312 of the present invention can be used with only an inner protective layer 356 without departing from the spirit of the present invention.

Hence, the window protector 312 of the present invention allows for easier replacement of protective sheets as compared to window protective devices of the prior art. This easier access facilitates the use of a protective layer on the outside surface of the glazing as replacement of this sheet is now simplified due to the ease of access provided by the window protector assembly of the preferred embodiment.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A window assembly mounted in a wall of a vehicle having an interior and an exterior side, the assembly comprising:
   a glazing;
   a frame having an integrally formed seating member that allows mounting of the glazing outward from the seating member, wherein the frame further includes an integrally formed flange that is offset inward from the seating member so as to define an integrally formed recess that is inward from the seating member and wherein the recess extends along at least portions of at least two opposed sections of the frame;
   a protective sheet positioned inward of the glazing such that at least two opposing edges of the protective sheet are positioned within the recess at the at least two opposed sections of the frame;
   wherein the recess is sized and the protective sheet is sized such that when the protective sheet is positioned within the recess, the protective sheet can be moved in a first direction with respect to the recess such that a first edge of the protective sheet can be exposed from the recess to thereby permit removal of the protective sheet.

2. The assembly of claim 1, further comprising a retainer that extends into the recess so as to reduce the movement of the protective sheet in the first direction so as to prevent the first edge of the protective sheet from being exposed from the recess so that the retainer inhibits removal of the protective sheet without previous removal of the retainer.

3. The assembly of claim 2, wherein the protective sheet comprises a sheet of acrylic material.

* * * * *